US012574914B2

(12) United States Patent
Yang et al.

(10) Patent No.: US 12,574,914 B2
(45) Date of Patent: Mar. 10, 2026

(54) RX-TX TIME DIFFERENCE REPORTING

(71) Applicant: QUALCOMM Incorporated, San Diego, CA (US)

(72) Inventors: Luanxia Yang, Beijing (CN); Changlong Xu, Beijing (CN); Jing Sun, San Diego, CA (US); Xiaoxia Zhang, San Diego, CA (US); Rajat Prakash, San Diego, CA (US); Ozcan Ozturk, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 18/018,033

(22) PCT Filed: Sep. 18, 2020

(86) PCT No.: PCT/CN2020/116225
§ 371 (c)(1),
(2) Date: Jan. 25, 2023

(87) PCT Pub. No.: WO2022/056848
PCT Pub. Date: Mar. 24, 2022

(65) Prior Publication Data
US 2023/0276421 A1     Aug. 31, 2023

(51) Int. Cl.
*H04W 72/11* (2023.01)
*H04W 24/08* (2009.01)
(Continued)

(52) U.S. Cl.
CPC ............ *H04W 72/11* (2023.01); *H04W 24/08* (2013.01); *H04W 24/10* (2013.01);
(Continued)

(58) Field of Classification Search
CPC ............. H04W 72/11; H04W 72/1273; H04W 72/232; H04W 76/20; H04W 72/20;
(Continued)

(56) References Cited

U.S. PATENT DOCUMENTS

2009/0005075 A1*  1/2009  Margrave .............. H04W 64/00
                                                    455/456.2
2015/0215107 A1   7/2015  Siomina et al.
(Continued)

FOREIGN PATENT DOCUMENTS

CN          103200610 B  * 11/2016  ........... G01S 5/0018
CN          107306448 A   10/2017
(Continued)

OTHER PUBLICATIONS

English Translation of WO-2016049860-A1, 2016, Retreived from PE2E Search on Apr. 14, 2025 (Year: 2016).*
(Continued)

*Primary Examiner* — Omar J Ghowrwal
(74) *Attorney, Agent, or Firm* — Procopio, Cory, Hargreaves & Savitch LLP

(57) ABSTRACT

The present disclosure relates to methods and devices for wireless communication including an apparatus, e.g., a UE and/or a base station. In one aspect, the apparatus may receive, from a base station, SPS via RRC signaling. The apparatus may also determine a UE Rx-Tx time difference, the UE Rx-Tx time difference being equal to a difference between a downlink subframe reception time and an uplink subframe transmission time. The apparatus may also transmit, to the base station, the UE Rx-Tx time difference or receive, from the base station, a base station Rx-Tx time difference, the base station Rx-Tx time difference being equal to a difference between an uplink subframe reception time and a downlink subframe transmission time.

31 Claims, 13 Drawing Sheets

(51) Int. Cl.

| | |
|---|---|
| *H04W 24/10* | (2009.01) |
| *H04W 56/00* | (2009.01) |
| *H04W 72/1273* | (2023.01) |
| *H04W 72/20* | (2023.01) |
| *H04W 72/232* | (2023.01) |
| *H04W 76/20* | (2018.01) |
| *H04L 5/00* | (2006.01) |
| *H04W 72/0446* | (2023.01) |

(52) U.S. Cl.
CPC ... *H04W 56/0065* (2013.01); *H04W 72/1273* (2013.01); *H04W 72/20* (2023.01); *H04W 72/232* (2023.01); *H04W 76/20* (2018.02); *H04L 5/0091* (2013.01); *H04W 72/0446* (2013.01)

(58) Field of Classification Search
CPC ............. H04W 72/0446; H04W 24/10; H04W 56/0065; H04W 24/08; H04L 5/0091
See application file for complete search history.

(56) References Cited

U.S. PATENT DOCUMENTS

| | | | |
|---|---|---|---|
| 2016/0150453 A1 | 5/2016 | Narayanan et al. | |
| 2020/0107209 A1* | 4/2020 | Ratasuk | H04L 5/0048 |
| 2023/0090914 A1* | 3/2023 | Cha | H04W 24/10 |
| | | | 370/329 |

FOREIGN PATENT DOCUMENTS

| | | | | |
|---|---|---|---|---|
| CN | 111356075 A | 6/2020 | | |
| EP | 3499984 A1 | 6/2019 | | |
| KR | 20030003633 A | 1/2003 | | |
| WO | WO-2011065456 A1 * | 6/2011 | ....... | H04W 72/1278 |
| WO | WO-2016049860 A1 * | 4/2016 | ........... | H04W 24/02 |
| WO | 2018031704 A1 | 2/2018 | | |
| WO | 2020146837 A1 | 7/2020 | | |
| WO | 2020153892 A1 | 7/2020 | | |
| WO | 2020159339 A1 | 8/2020 | | |
| WO | 2021162514 A1 | 8/2021 | | |

OTHER PUBLICATIONS

English Translation of WO-2011065456-A1, 2011, Retreived from PE2E Search on Apr. 14, 2025 (Year: 2011).*

English Translation of CN-103200610-B, 2016, Retrieved from PE2E Search on Apr. 15, 2025 (Year: 2016).*

English Translation of WO-2020159339-A1, 2020, Retrieved from PE2E Search on Apr. 11, 2025 (Year: 2020).*

Supplementary European Search Report—EP20953706—Search Authority—The Hague—May 6, 2024.

Intel Corporation: "Discussion on UE RX-TX Time Difference Measurement Requirements for NR Pos", R4-2009743, 3GPP TSG-RAN WG4 Meeting# 96-e, Electronic Meeting, Aug. 17-Aug. 28, 2020, 7 Pages, Aug. 28, 2020 (Aug. 28, 2020) sections 2-3.

Intel Corporation: "Further Discussion on UE RX-TX Time Difference Requirements", 3GPP TSG-RAN WG4 Meeting # 95-e, R4-2006557, Electronic Meeting, May 25-Jun. 5, 2020, 4 Pages, Jun. 5, 2020 (Jun. 5, 2020) the whole document.

International Search Report and Written Opinion—PCT/CN2020/116225—ISA/EPO—Jun. 28, 2021.

Qualcomm Incorporated: "Introduction of UE RX-TX Time Difference Measurement Requirements for NR Positioning", 3GPP TSG-RAN WG4 Meeting# 96-e, Aug. 28, 2020 (Aug. 28, 2020) the whole document.

CATT: "Discussion on UE Rx-Tx time difference Measurement requirements", 3GPP RAN WG4 Meeting #95-e, R4-2006234, Electronic Meeting, May 25-Jun. 5, 2020, May 16, 2016, 4 Pages.

* cited by examiner

RX-TX TIME DIFFERENCE REPORTING

CROSS REFERENCE TO RELATED APPLICATION(S)

This application is a National Stage Application filed under 35 U.S.C. § 371 of PCT International Application No. PCT/CN2020/116225, entitled "METHODS AND APPA-RATUS FOR RX-TX TIME DIFFERENCE REPORTING" and filed Sep. 18, 2020, which is expressly incorporated by reference herein in its entirety.

BACKGROUND

Technical Field

The present disclosure relates generally to communication systems, and more particularly, to time difference reporting in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced (pc)mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a base station, semi-persistent scheduling (SPS) via radio resource control (RRC) signaling. The apparatus may also determine a UE reception (Rx) transmission (Tx) (Rx-Tx) time difference, the UE Rx-Tx time difference being equal to a difference between a downlink subframe reception time and an uplink subframe transmission time. The apparatus may also monitor for a physical downlink control channel (PDCCH) from the base station, and receive the PDCCH from the base station, where the PDCCH indicates whether to transmit the UE Rx-Tx time difference or receive the base station Rx-Tx time difference. Additionally, the apparatus may determine whether at least one uplink resource is available for transmission. The apparatus may also transmit, to the base station, the UE Rx-Tx time difference or receive, from the base station, a base station Rx-Tx time difference, the base station Rx-Tx time difference being equal to a difference between an uplink subframe reception time and a downlink subframe transmission time. Further, when the base station Rx-Tx time difference is received from the base station, the apparatus may calculate a propagation delay value, where the propagation delay value is equal to a sum of the UE Rx-Tx time difference and the base station Rx-Tx time difference. Also, when the UE Rx-Tx time difference is transmitted to the base station, the apparatus may receive, from the base station, a propagation delay value, where the propagation delay value is equal to a sum of the UE Rx-Tx time difference and the base station Rx-Tx time difference.

In another aspect of the disclosure, a method, a computer-readable medium, and an apparatus are provided. The apparatus may be a base station. The apparatus may transmit, to a user equipment (UE), semi-persistent scheduling (SPS) via radio resource control (RRC) signaling. The apparatus may also determine a base station reception (Rx) transmission (Tx) (Rx-Tx) time difference, the base station Rx-Tx time difference being equal to a difference between an uplink subframe reception time and a downlink subframe transmission time. The apparatus may also transmit a physical downlink control channel (PDCCH) to the UE, where the PDCCH indicates whether to transmit the base station Rx-Tx time difference or receive the UE Rx-Tx time difference. Moreover, the apparatus may transmit, to the UE, the base station Rx-Tx time difference or receive, from the UE, a UE Rx-Tx time difference, the UE Rx-Tx time difference being equal to a difference between a downlink subframe reception time and an uplink subframe transmission time. When the base station Rx-Tx time difference is transmitted to the UE, the apparatus may receive, from the UE, a propagation delay value, where the propagation delay value is equal to a sum of the base station Rx-Tx time difference and the UE Rx-Tx time difference. When the UE Rx-Tx time difference is received from the UE, the apparatus may calculate a propagation delay value, where the propagation delay value is equal to a sum of the base station Rx-Tx time difference and the UE Rx-Tx time difference.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
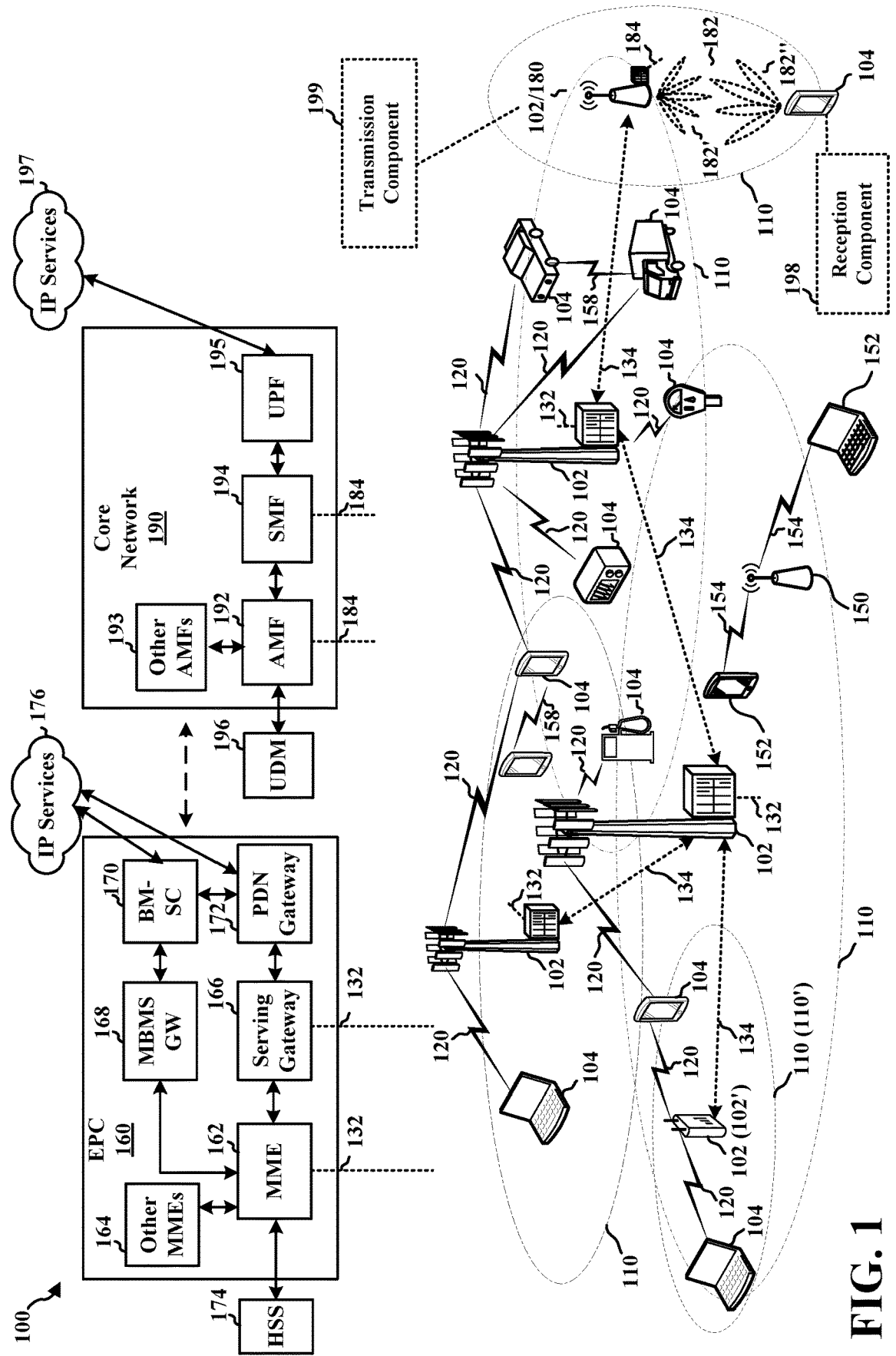
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WIMEDIA, BLUETOOTH, ZIGBEE, WI-FI based on the Institute of Electrical and Electronics Engineers (IEEE) 802.11 standard, LTE, or NR.

The wireless communications system may further include a WI-FI access point (AP) 150 in communication with WI-FI stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the WI-FI AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a reception component 198 configured to receive, from a base station, semi-persistent scheduling (SPS) via radio resource control (RRC) signaling. Reception component 198 may also be configured to determine a UE reception (Rx) transmission (Tx) (Rx-Tx) time difference, the UE Rx-Tx time difference being equal to a difference between a downlink subframe reception time and an uplink subframe transmission time. Reception component 198 may also be configured to monitor for a physical downlink control channel (PDCCH) from the base station, and configured to receive the PDCCH from the base station, where the PDCCH indicates whether to transmit the UE Rx-Tx time difference or receive the base station Rx-Tx time difference. Reception component 198 may also be configured to determine whether at least one uplink resource is available for transmission. Reception component 198 may also be configured to transmit, to the base station, the UE Rx-Tx time difference or receive, from the base station, a base station Rx-Tx time difference, the base station Rx-Tx time difference being equal to a difference between an uplink subframe reception time and a downlink subframe transmission time. Further, when the base station Rx-Tx time difference is received from the base station, reception component 198 may be configured to calculate a propagation delay value, where the propagation delay value is equal to a sum of the UE Rx-Tx time difference and the base station Rx-Tx time difference. Also, when the UE Rx-Tx time difference is transmitted to the base station, reception component 198 may be configured to receive, from the base station, a propagation delay value, where the propagation delay value is equal to a sum of the UE Rx-Tx time difference and the base station Rx-Tx time difference.

Referring again to FIG. 1, in certain aspects, the base station 180 may include a transmission component 199 configured to transmit, to a user equipment (UE), semi-persistent scheduling (SPS) via radio resource control (RRC) signaling. Transmission component 199 may also be configured to determine a base station reception (Rx) transmission (Tx) (Rx-Tx) time difference, the base station Rx-Tx time difference being equal to a difference between an uplink subframe reception time and a downlink subframe transmission time. Transmission component 199 may also be configured to transmit a physical downlink control channel (PDCCH) to the UE, where the PDCCH indicates whether to transmit the base station Rx-Tx time difference or receive the UE Rx-Tx time difference. Transmission component 199 may also be configured to transmit, to the UE, the base station Rx-Tx time difference or receive, from the UE, a UE Rx-Tx time difference, the UE Rx-Tx time difference being equal to a difference between a downlink subframe reception time and an uplink subframe transmission time. When the base station Rx-Tx time difference is transmitted to the UE, transmission component 199 may be configured to receive, from the UE, a propagation delay value, where the propagation delay value is equal to a sum of the base station Rx-Tx time difference and the UE Rx-Tx time difference. When the UE Rx-Tx time difference is received from the UE, transmission component 199 may be configured to calculate a propagation delay value, where the propagation delay value is equal to a sum of the base station Rx-Tx time difference and the UE Rx-Tx time difference.

Although the following description may be focused on 5G NR, the concepts described herein may be applicable to other similar areas, such as LTE, LTE-A, CDMA, GSM, and other wireless technologies.

Figures 2A, 2B, 2C, 2D:
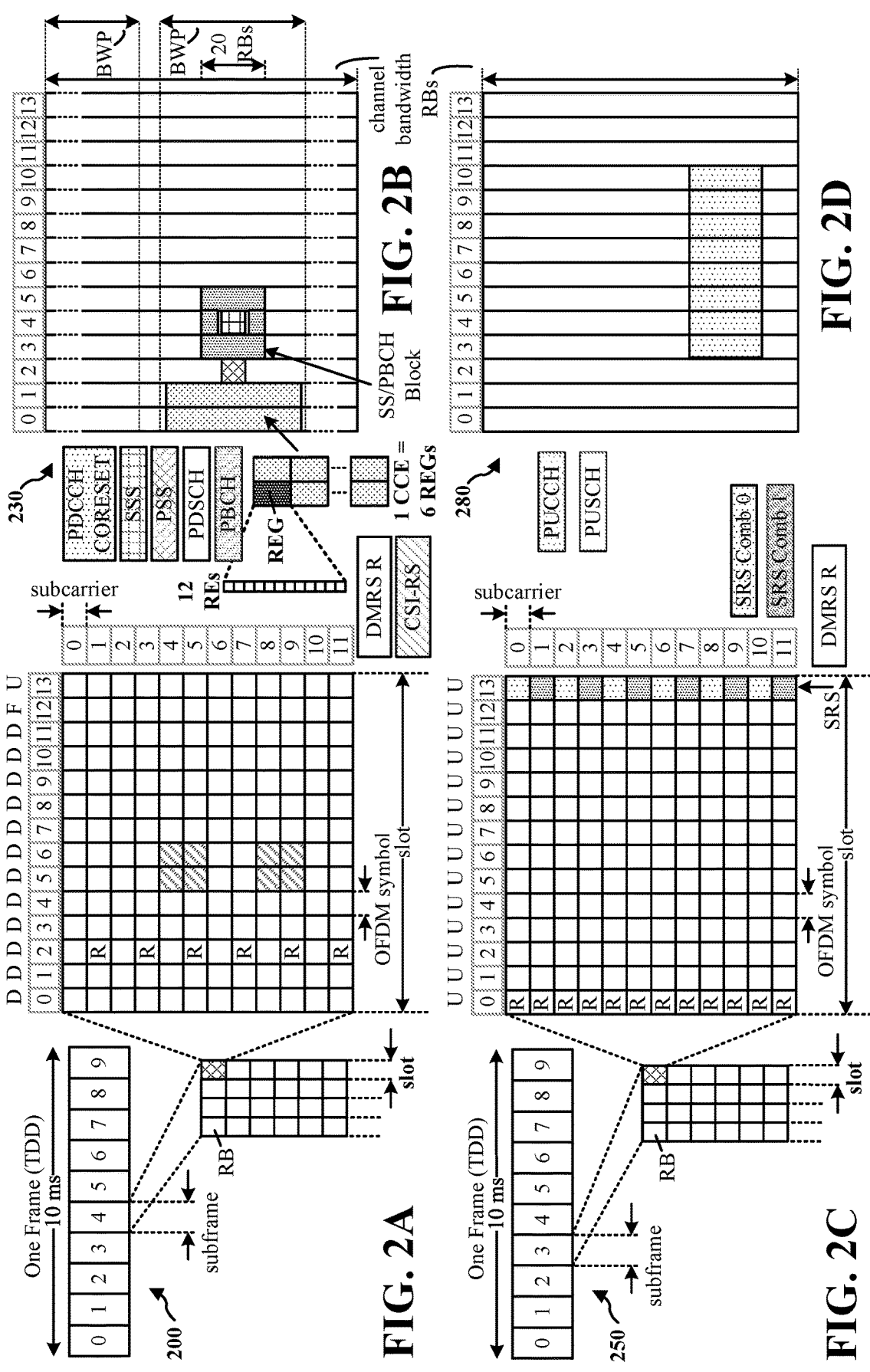
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
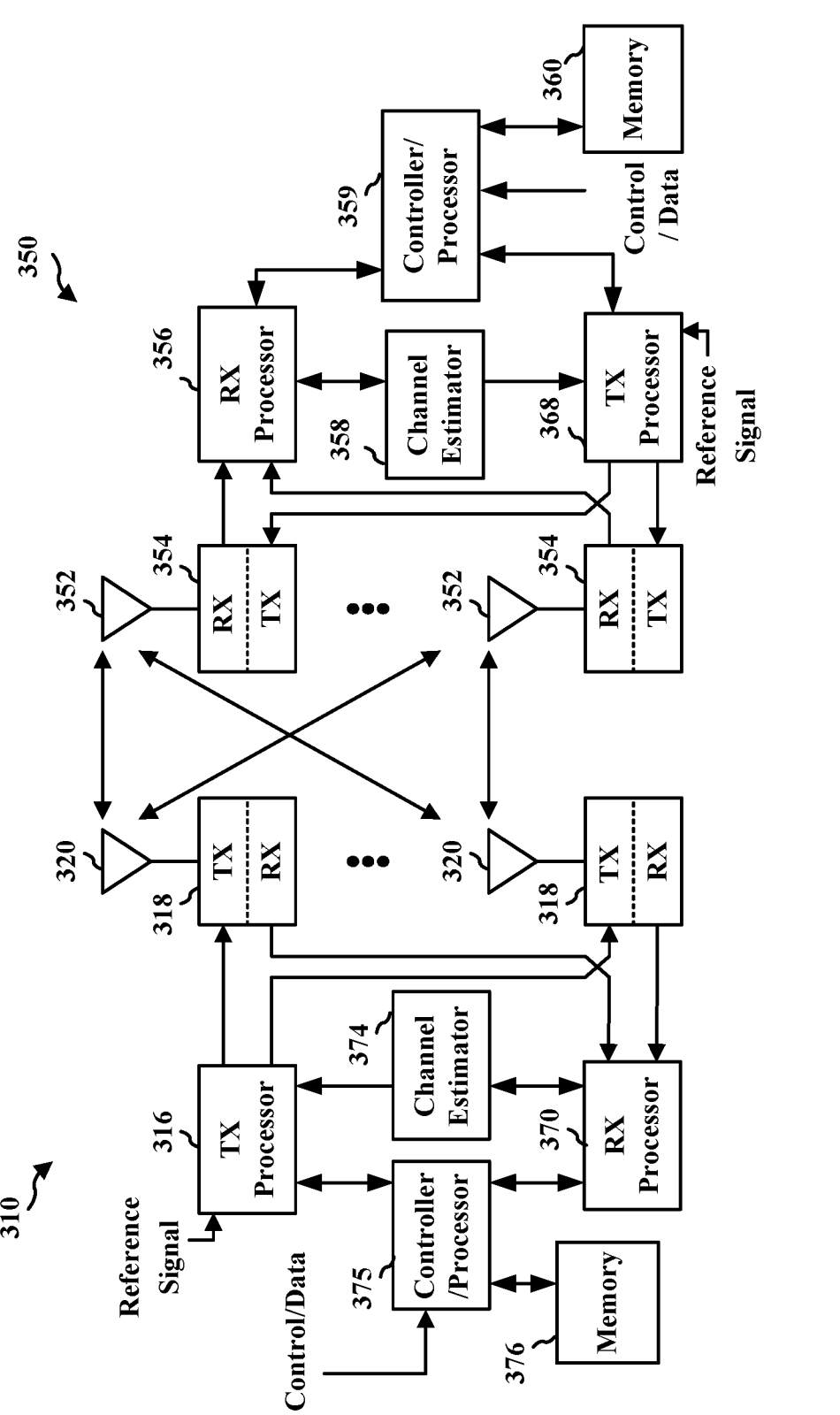
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of wireless communication include a number of enhancements, such as physical (PHY) layer feedback enhancements for meeting ultra-reliable low latency communication (URLLC), UE feedback enhancements, and/or CSI feedback enhancements to allow for more accurate modulation and coding scheme (MCS) selection. Wireless communications can also include uplink enhancements for URLLC in unlicensed controlled environments. Aspects of wireless communications can also include UE-initiated channel occupancy time (COT) for frame based equipment (FBE). Additionally, wireless communication can include harmonizing uplink configured grant enhancements in URLLC that are introduced to be applicable for an unlicensed spectrum.

In some aspects of wireless communication, there may be intra-UE multiplexing and prioritization of traffic with different priorities. Aspects of wireless communications can also specify multiplexing behavior among HARQ-ACK, SR, or CSI and PUSCH for traffic with different priorities, including the cases with UCI on PUCCH and UCI on PUSCH. Aspects of wireless communication can also specify PHY prioritization of overlapping dynamic grant PUSCH and configured grant PUSCH of different PHY priorities on a bandwidth part (BWP) of a serving cell including the related cancelation behavior for the PUSCH of a lower PHY priority.

Some aspects of wireless communication can also include enhancements for the support of time synchronization. For instance, there may be uplink time synchronization for time-sensitive networking (TSN). There may also be propagation delay compensation enhancements including mobility issues. Additionally, there may be enhancements based on quality of service (QoS) related parameters, e.g., survival time and burst spread.

In some aspects, where a TSN grandmaster clock is at an end station connected to a first UE (UE1) and may be relayed to an end station connected to a second UE (UE2), two Uu interfaces may introduce a combined uncertainty that exceeds a maximum uncertainty, e.g., 900 ns, allowed for a wireless communication system. For a radio link, the propagation delay may be half of the timing advance (TA). There may also be alternative methods for determining the downlink propagation delay value used to adjust a 5G reference time. For example, there may be a legacy timing advanced procedure, which can be used for determining a downlink propagation delay. This legacy procedure may help to determine which corresponding sources of uncertainty can be mitigated towards satisfying a synchronicity specification per Uu interface. Also, there may be a time-difference measurement based procedure for a timing advance calculation, which can be based on two measurements: UE reception (Rx) transmission (Tx) (Rx-Tx) time difference and base station Rx-Tx time difference.

14

Figure 4:
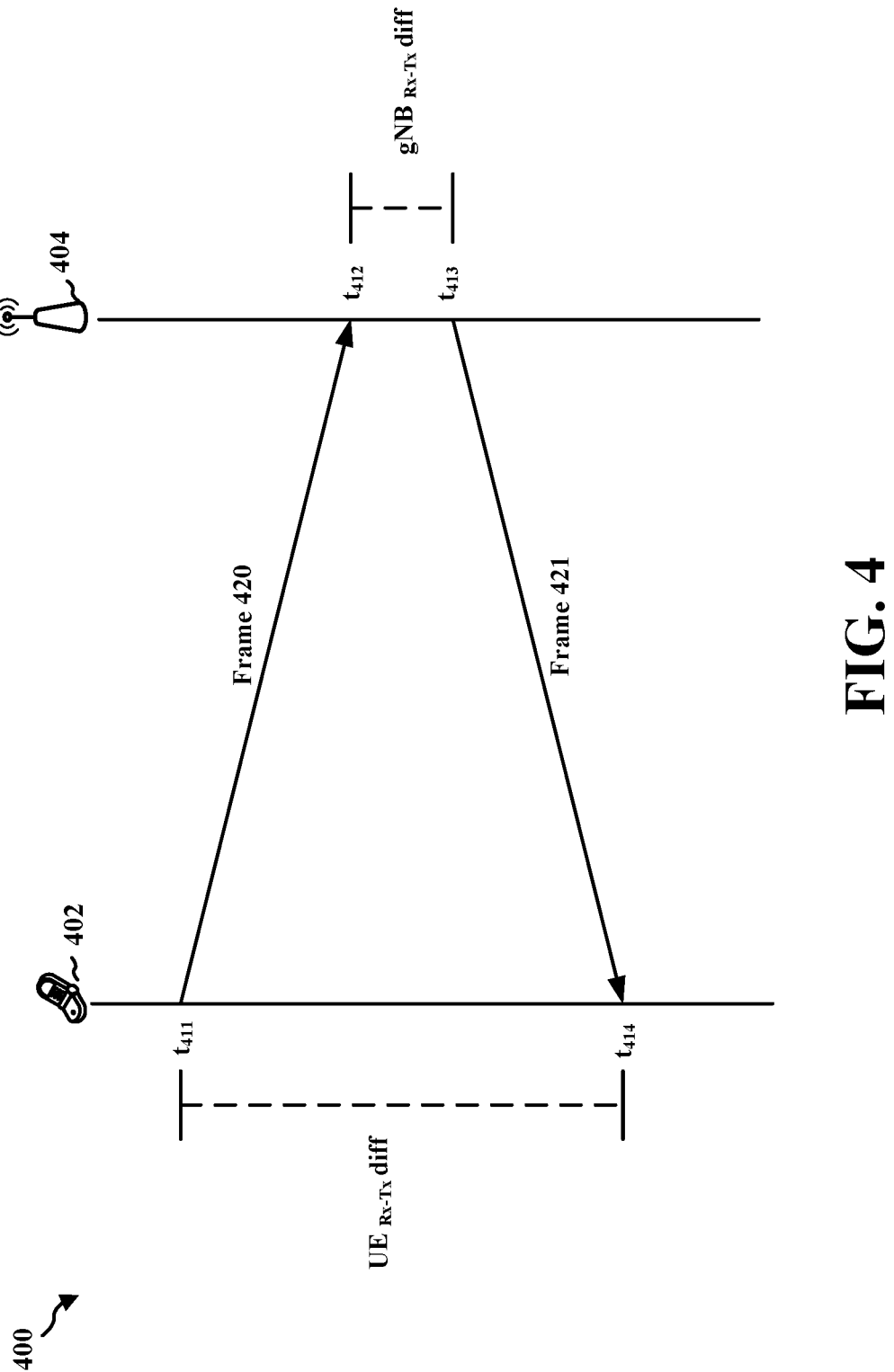
FIG. 4 is a diagram illustrating example communication between a UE and a base station in accordance with one or more techniques of the present disclosure.

FIG. 4 is a diagram 400 illustrating example communication between a UE 402 and a base station 404. As shown in FIG. 4, diagram 400 includes $t_{411}$, which is an uplink transmission time of frame 420 at UE 402, and $t_{412}$, which is an uplink reception time of frame 420 at base station 404. Diagram 400 also includes $t_{413}$, which is a downlink transmission time of frame 421 at base station 404, and $t_{414}$, which is a downlink reception time of frame 421 at UE 402. Also, diagram 400 includes a UE Rx-Tx time difference ($UE_{Rx-Tx}$), e.g., $t_{411}-t_{414}$, and a base station Rx-Tx time difference (gNB Rx-Tx), e.g., $t_{412}-t_{413}$.

FIG. 4 displays a procedure for allowing a UE to determine a value for the downlink propagation delay which may utilize an enhanced round trip time (RTT) method. As shown in FIG. 4, some aspects of wireless communication can utilize a number of definitions for propagation delay. For example, the UE Rx-Tx time difference may be defined as $t_4-t_1$. For instance, $t_4$ may be the UE receive timing of a downlink subframe, e.g., subframe i, defined by the first detected path in time. Also, $t_1$ may be the UE transmit timing of an uplink subframe, e.g., subframe j, that is closest in time to the subframe i. As shown in FIG. 4, the base station Rx-Tx time difference may be defined as $t_3-t_2$. Further, $t_3$ may be the base station receive timing of an uplink subframe, e.g., subframe i, containing a suitable SRS associated with UE, which can be defined by the first detected path in time. Additionally, $t_2$ can be the base station transmit timing of a downlink subframe, e.g., subframe j, that is closest in time to the subframe i received from the UE.

Figure 5B:
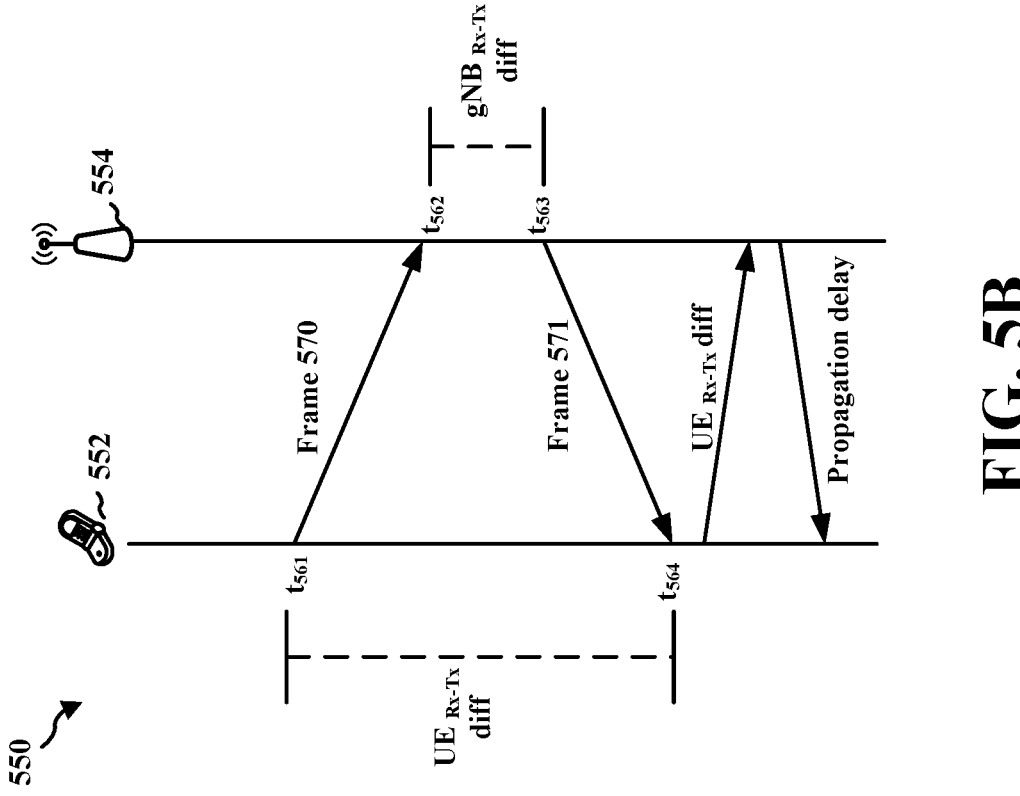
FIGS. 5A and 5B are diagrams illustrating example communication between a UE and a base station in accordance with one or more techniques of the present disclosure.
Figure 5A:
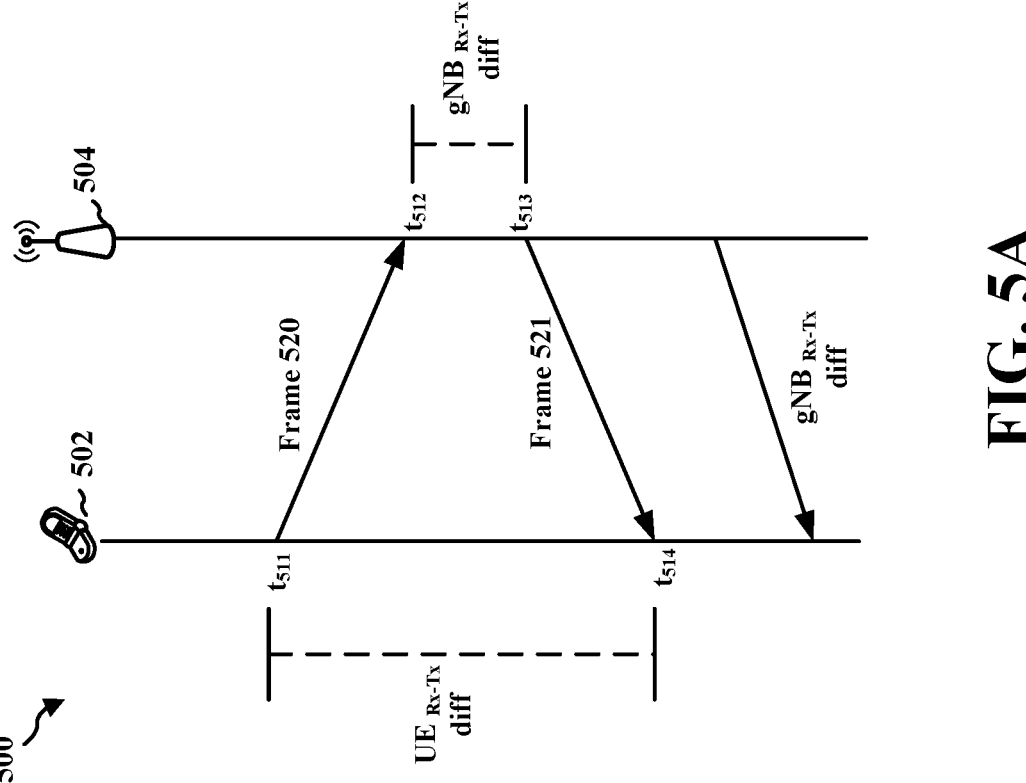

FIGS. 5A and 5B are diagrams 500 and 550, respectively, illustrating example communication between a UE 502/552 and a base station 504/554. FIGS. 5A and 5B show two possibilities as to how the signaling between a UE and a base station occurs, in order to successfully obtain RTT information at the UE for a delay compensation.

As shown in FIG. 5A, diagram 500 includes $t_{511}$, which is an uplink transmission time of frame 520 at UE 502, and $t_{512}$, which is an uplink reception time of frame 520 at base station 504. Diagram 500 also includes $t_{513}$, which is a downlink transmission time of frame 521 at base station 504, and $t_{514}$, which is a downlink reception time of frame 521 at UE 502. Also, diagram 500 includes a UE Rx-Tx time difference ($UE_{Rx-Tx}$), e.g., $t_{511}-t_{514}$, and a base station Rx-Tx time difference ($gNB_{Rx-Tx}$), e.g., $t_{512}-t_{513}$. FIG. 5A shows a one-step exchange to obtain the round trip time (RTT) information. For instance, the base station 504 can directly signal the value of base station Rx-Tx time difference ($gNB_{Rx-Tx}$) to the UE 502. The UE 502 can then directly calculate the RTT or propagation delay value by adding the UE Rx-Tx time difference ($UE_{Rx-Tx}$) and the base station Rx-Tx time difference, e.g., UE Rx-Tx $gNB_{Rx-Tx}$.

As shown in FIG. 5B, diagram 550 includes $t_{561}$, which is an uplink transmission time of frame 570 at UE 552, and $t_{562}$, which is an uplink reception time of frame 570 at base station 554. Diagram 550 also includes $t_{563}$, which is a downlink transmission time of frame 571 at base station 554, and $t_{564}$, which is a downlink reception time of frame 571 at UE 552. Also, diagram 550 includes a UE Rx-Tx time difference ($UE_{Rx-Tx}$), e.g., $t_{561}-t_{564}$, and a base station Rx-Tx time difference ($gNB_{Rx-Tx}$), e.g., $t_{562}-t_{563}$. FIG. 5B shows a two-step exchange to obtain the RTT information. For example, the UE 552 signals the $UE_{Rx-Tx}$ value to the base station 554. The base station 554 can calculate the RTT or propagation delay value by adding the value of the time differences, e.g., $UE_{Rx-Tx}+gNB_{Rx-Tx}$. The base station 554 can then signal the propagation delay value to be used for compensation directly to the UE 552.

As mentioned above, the RTT may be introduced for positioning. If the RTT is utilized for propagation delay compensation, there may be two possibilities for the signaling between the UE and the base station. However, there may be no determination of when to trigger the signaling between the UE and the base station. Based on the above, it may be beneficial to also consider when to trigger the signaling between the UE and the base station. For instance, it may be beneficial to determine when to trigger or send either of the Rx-Tx time differences. Accordingly, it may be beneficial to determine when to transmit or receive the UE Rx-Tx time difference and the base station Rx-Tx time difference.

Aspects of the present disclosure may consider when to trigger the signaling between the UE and the base station. For instance, aspects of the present disclosure may determine when to trigger or send either of the Rx-Tx time differences. As such, aspects of the present disclosure may determine when to transmit or receive the UE Rx-Tx time difference and the base station Rx-Tx time difference. Aspects of the present disclosure may consider multiple options for triggering the Rx-Tx time differences, such as periodically transmitting or receiving the Rx-Tx time differences. Also, the present disclosure may trigger the Rx-Tx time difference transmission based on a specific event.

In some aspects, the periodic transmission of the Rx-Tx time differences may include different cases or transmission orders. In one aspect, the base station can send the base station Rx-Tx time difference (gNB Rx-Tx) to the UE. In this aspect, the base station can use a SPS PDSCH to transmit the Rx-Tx time difference to the UE. In another aspect, the UE can send the UE Rx-Tx time difference (UE Rx-Tx) to the base station. In this aspect, the UE can use an uplink configured grant (CG) to transmit the UE Rx-Tx time difference to the base station.

Additionally, aspects of the present disclosure can include multiple options to activate the configured scheduling or transmission of the Rx-Tx time difference. In one aspect, radio resource control (RRC) signaling may automatically activate the configured scheduling or transmission of the Rx-Tx time difference. In another aspect, a PDCCH may be used to activate the configured scheduling or transmission of the Rx-Tx time difference.

Figure 6B:
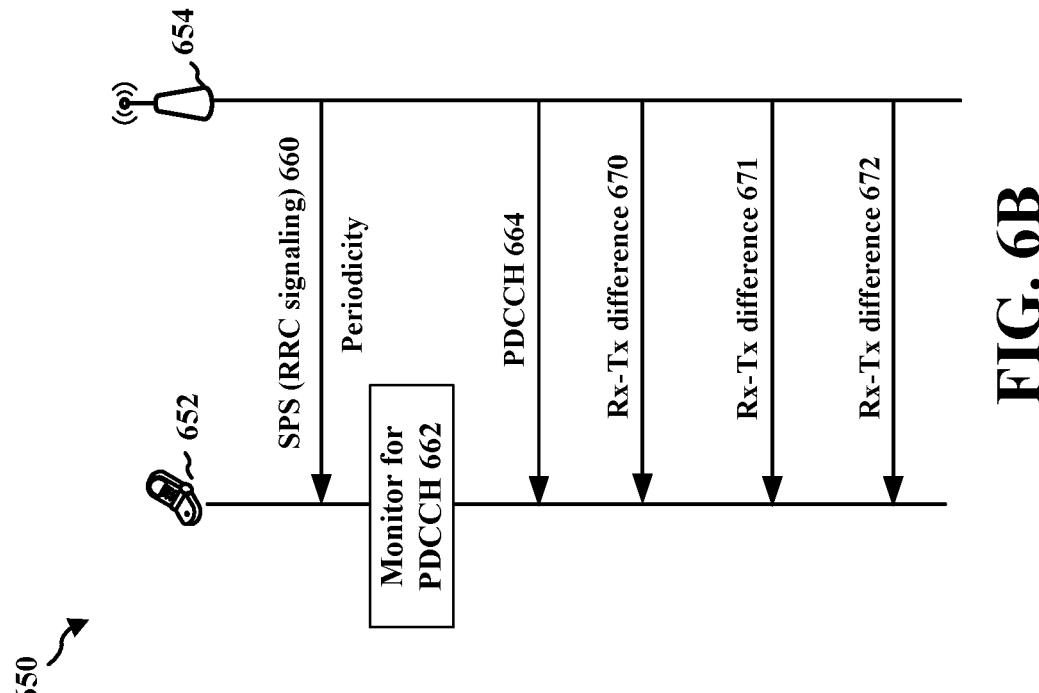
FIGS. 6A and 6B are diagrams illustrating example communication between a UE and a base station in accordance with one or more techniques of the present disclosure.
Figure 6A:
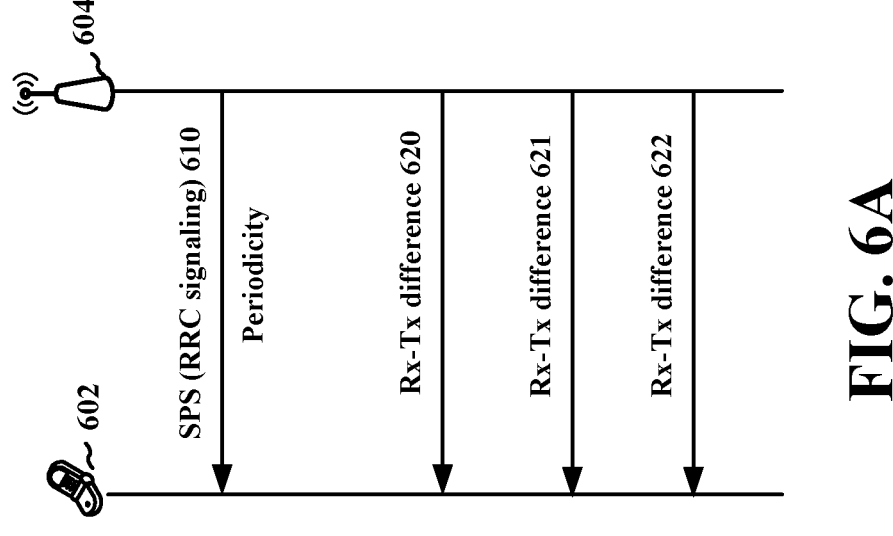
Figure 6A:

FIGS. 6A and 6B are diagrams 600 and 650, respectively, illustrating example communication between a UE 602/652 and a base station 604/654. FIGS. 6A and 6B display a base station 604/654 transmitting a base station Rx-Tx time difference (gNB Rx-Tx) to a UE 602/652. As shown in FIG. 6A, diagram 600 includes UE 602, base station 604, SPS 610, and base station Rx-Tx time difference 620/621/622. FIG. 6A depicts that the transmission of the base station Rx-Tx time difference 620/621/622 may be activated by SPS 610 via RRC signaling. As shown in FIG. 6B, diagram 650 includes UE 652, base station 654, SPS 660, UE monitoring for PDCCH 662, PDCCH 664, and base station Rx-Tx time difference 670/671/672. FIG. 6B shows that the transmission of the base station Rx-Tx time difference 670/671/672 may be activated by a PDCCH 664 from the base station 654.

Figure 7B:
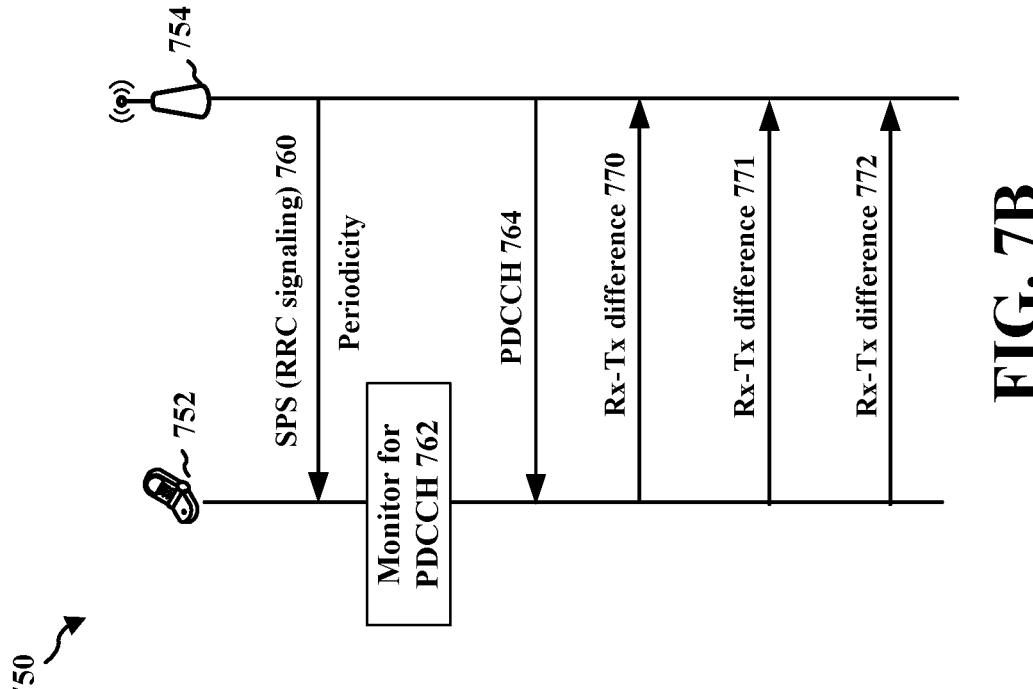
FIGS. 7A and 7B are diagrams illustrating example communication between a UE and a base station in accordance with one or more techniques of the present disclosure.
Figure 7A:
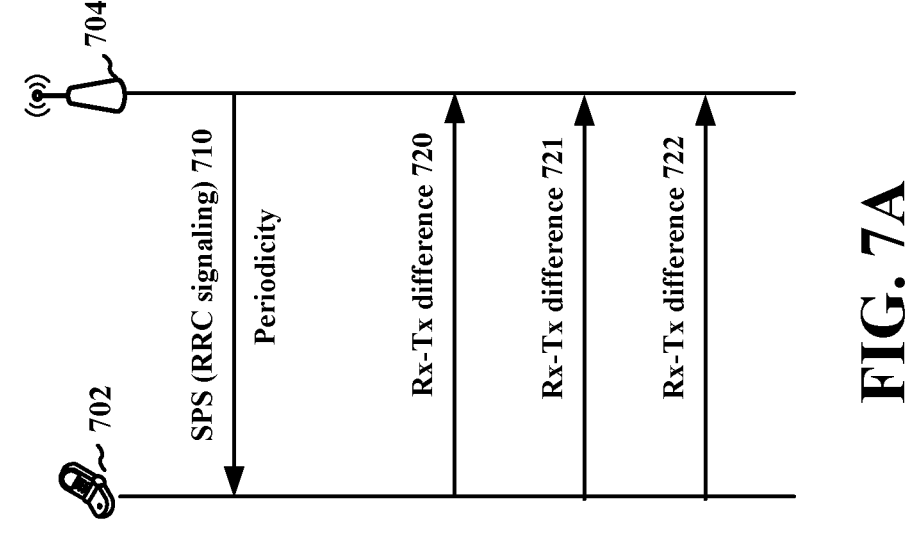

FIGS. 7A and 7B are diagrams 700 and 750, respectively, illustrating example communication between a UE 702/752 and a base station 704/754. FIGS. 7A and 7B display a UE 702/752 transmitting the UE Rx-Tx time difference (UE Rx-Tx) to a base station 704/754. As shown in FIG. 7A, diagram 700 includes UE 702, base station 704, SPS 710, and UE Rx-Tx time difference 720/721/722. FIG. 7A depicts that the transmission of the UE Rx-Tx time difference 720/721/722 may be activated by the SPS 710 via RRC signaling. As shown in FIG. 7B, diagram 750 includes UE 752, base station 754, SPS 760, UE monitoring for PDCCH 762, PDCCH 764, and UE Rx-Tx time difference 770/771/772. FIG. 7B illustrates that the transmission of the UE Rx-Tx time difference 770/771/772 may be activated by a PDCCH 764 from the base station 754.

As indicated herein, the periodic Rx-Tx time difference measurement and signaling or transmission may be handled by RRC signaling. Aspects of the present disclosure may also map a Rx-Tx time difference message, e.g., a MAC CE or an RRC message, to a configured grant (CG) instance. For instance, when a base station transmits the base station Rx-Tx time difference (gNB Rx-Tx) to the UE, the base station can schedule an SPS PDSCH. When a UE transmits the UE Rx-Tx time difference (UE Rx-Tx) to the base station, aspects of the present disclosure may utilize a predefined time offset between a physical (PHY) layer and an RRC message or a MAC-CE. This time offset may allow the RRC to finish the measurement and signaling, and then the Rx-Tx time difference message can be generated in time for a current CG occasion.

In some instances, when a UE transmits the UE Rx-Tx time difference to the base station, aspects of the present disclosure may disable a scheduling request (SR) at a more granular level. For instance, some SR disabling at the logic channel level may disable a SR for all RRC messages, while the disabling may not be available for MAC-CEs. This may result in more important RRC messages, such as messages for the measurement reporting of a handover, being delayed. In order to address this, aspects of the present disclosure may disable a SR at a more granular level. For example, the present disclosure may disable a SR for a group of RRC messages or a group of MAC-CEs.

Additionally, when a UE transmits the UE Rx-Tx time difference to the base station, aspects of the present disclosure may introduce a SR delay timer. In order to avoid more important RRC messages being delayed, such as messages for measurement reporting for a handover, the present disclosure can introduce the SR delay timer for a specific group RRC messages or MAC-CEs. Moreover, when a UE transmits the UE Rx-Tx time difference to the base station, aspects of the present disclosure may define a new logic channel for a specific group of RRC messages. Aspects of the present disclosure may disable a SR or introduce a SR delay timer for the logic channel.

In some aspects, the periodic transmission of the Rx-Tx time difference may cause resource consumption, as the Rx-Tx time difference may change slightly for a long duration. Aspects of the present disclosure may utilize the resource more efficiently. For instance, the present disclosure may consider aperiodic transmission of the Rx-Tx time difference. Also, the Rx-Tx time difference transmission may be triggered based on some specified events.

Figure 8:
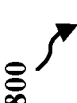
FIG. 8 is a diagram illustrating example communication between a UE and a base station in accordance with one or more techniques of the present disclosure.

FIG. 8 is a diagram 800 illustrating example communication between a UE 802 and a base station 804. As shown in FIG. 8, diagram 800 includes $t_{811}$, which is an uplink transmission time of frame 820 at UE 802, and $t_{812}$, which is an uplink reception time of frame 820 at base station 804. Diagram 800 also includes $t_{813}$, which is a downlink transmission time of frame 821 at base station 804, and $t_{814}$, which is a downlink reception time of frame 821 at UE 802. Also, diagram 800 includes a UE Rx-Tx time difference ($UE_{Rx-Tx}$), e.g., $t_{811}$-$t_{814}$, and a base station Rx-Tx time difference ($gNB_{Rx-Tx}$), e.g., $t_{812}$-$t_{813}$. Diagram 800 also depicts a third symbol of slot n, e.g., at $t_{811}$, and a third symbol of slot n+1, e.g., at $t_{813}$.

As shown in FIG. 8, in some aspects, a difference or threshold of the Rx-Tx time difference can trigger the Rx-Tx time difference transmission. In order to use the difference of the Rx-Tx time difference to determine whether the propagation delay is changed or not, the present disclosure may include a strong relation of transmission time between the base station and the UE. For instance, $t_2$-$t_1$ may be equal to a predefined value, i.e., the present disclosure may allow a UE to transmit a signal at a certain symbol of a certain slot, e.g., a third symbol of slot n, and the base station may transmit a signal at a symbol of another slot, e.g., a third symbol of slot n+1, where $t_2$-$t_1$ is equal to one slot.

Additionally, the present disclosure may utilize a pathloss change to trigger the Rx-Tx time difference transmission. Also, an adjustment of a timing advance (TA) can trigger the Rx-Tx time difference transmission. Further, mobility events, e.g., a UE mobility or a handover, can trigger the Rx-Tx time difference transmission.

As indicated above, a difference or threshold in the Rx-Tx time difference or a pathloss change can trigger the Rx-Tx time difference transmission. In these aspects, if the base station determines that an Rx-Tx difference (e.g., $t_3$-$t_2$) or an uplink pathloss change exceeds a predefined threshold, the base station can transmit the Rx-Tx time difference (e.g., $t_3$-$t_2$) to the UE. The base station can automatically send the Rx-Tx time difference to the UE. Once the UE receives the information of the Rx-Tx difference (e.g., $t_3$-$t_2$), the UE can determine whether the time difference (e.g., $t_3$-$t_2$) exceeds a predefined threshold, and whether a propagation delay compensation may be calculated.

Additionally, if the base station determines that an Rx-Tx difference (e.g., $t_3$-$t_2$) or an uplink pathloss change exceeds a predefined threshold, the UE can transmit the Rx-Tx time difference (e.g., $t_4$-$t_1$) to the base station. When a time difference, e.g., the difference between $t_3$-$t_2$, or the uplink pathloss exceeds a predefined threshold, and another time difference, e.g., the difference between $t_4$-$t_1$, or a downlink pathloss at the UE side may not exceed the threshold, the base station may send some signaling to inform the UE to send the Rx-Tx time difference, e.g., $t_4$-$t_1$, and then perform a propagation delay compensation. If there is an available uplink resource, one (1) bit may be added to a PDCCH to indicate whether the Rx-Tx time difference transmission may be needed. For example, if the bit is '1', the UE may transmit the Rx-Tx time difference to the base station. Also, if there is an available uplink resource, and a PDCCH has 24 cyclic redundancy cycle (CRC) bits, a mask can be used to indicate whether the Rx-Tx time difference transmission may be needed or not. If a base station asks the UE to transmit the Rx-Tx time difference, the base station may add a mask to a few CRC bits, e.g., the last 6 CRC bits. Further, if there is an available uplink resource, a MAC-CE can be used to indicate whether the Rx-Tx time difference may be needed.

In other aspects, if there is no uplink resource available, the base station can send an uplink grant to the UE. For instance, one bit in the uplink grant may indicate to transmit the Rx-Tx time difference. Moreover, if there is no uplink resource available, the base station may send an uplink grant to the UE without any indicated bit. For example, the UE may use this allocated resource to transmit the Rx-Tx time difference autonomously.

In some aspects, if the UE determines that an Rx-Tx time difference (e.g., $t_4$-$t_1$) or a downlink pathloss change exceeds a predefined threshold, the base station can transmit the Rx-Tx time difference (e.g., $t_3$-$t_2$) to the UE. If the time difference, e.g., the difference between $t_4$-$t_1$, or the downlink pathloss exceeds the predefined threshold, but the difference between $t_3$-$t_2$ or the uplink pathloss at the base station does not exceed the predefined threshold, the UE may send some signaling to inform the base station that there may be a need for the $t_3$-$t_2$ transmission. If there is an available uplink resource, a UE can transmit a MAC-CE to a base station to inform that there may be a need for the Rx-Tx time difference transmission. Also, if there is an available uplink resource, one bit may be added to UCI. For example, if the bit is '1', the base station may send the Rx-Tx time difference to the UE. If there is no uplink resource available, the UE can send a SR to inform the base station that there may be a need for the Rx-Tx time difference transmission.

Additionally, if the UE determines that an Rx-Tx time difference (e.g., $t_4$-$t_1$) or a downlink pathloss change exceeds a predefined threshold, the UE can transmit the Rx-Tx time difference (e.g., $t_4$-$t_1$) to the base station. If there is an available uplink resource, the UE can automatically send the Rx-Tx time difference to the base station. Once the base station receives the time difference information, e.g., $t_4$-$t_1$, the base station may determine whether the time difference information, e.g., $t_4$-$t_1$, exceeds a predefined threshold, and that a propagation delay compensation may be needed. If there is no uplink resource available, the UE can send a SR to inform the base station whether there may be a need for the Rx-Tx time difference transmission.

As indicated above, a TA adjustment or mobility events, e.g., a UE mobility or a handover, can trigger the Rx-Tx time difference transmission. If the adjustment of a TA exceeds the predefined threshold or a mobility or handover occurs, the base station may transmit the Rx-Tx time difference (e.g., $t_3$-$t_2$) to the UE. For instance, the base station can automatically send the Rx-Tx time difference to the UE.

Additionally, if the adjustment of a TA exceeds the predefined threshold or a mobility or handover occurs, a UE may transmit the Rx-Tx time difference (e.g., $t_4$-$t_1$) to the base station. If there is an available uplink resource, the UE can automatically send the Rx-Tx time difference to the base station. If there is no uplink resource available, the UE can send a SR to request the resource for the Rx-Tx time difference transmission. Also, if there is no uplink resource available, the base station may send an uplink grant to allow the UE to transmit the Rx-Tx time difference. In some instances, the base station may not wait for the UE to transmit a SR.

Figure 9:
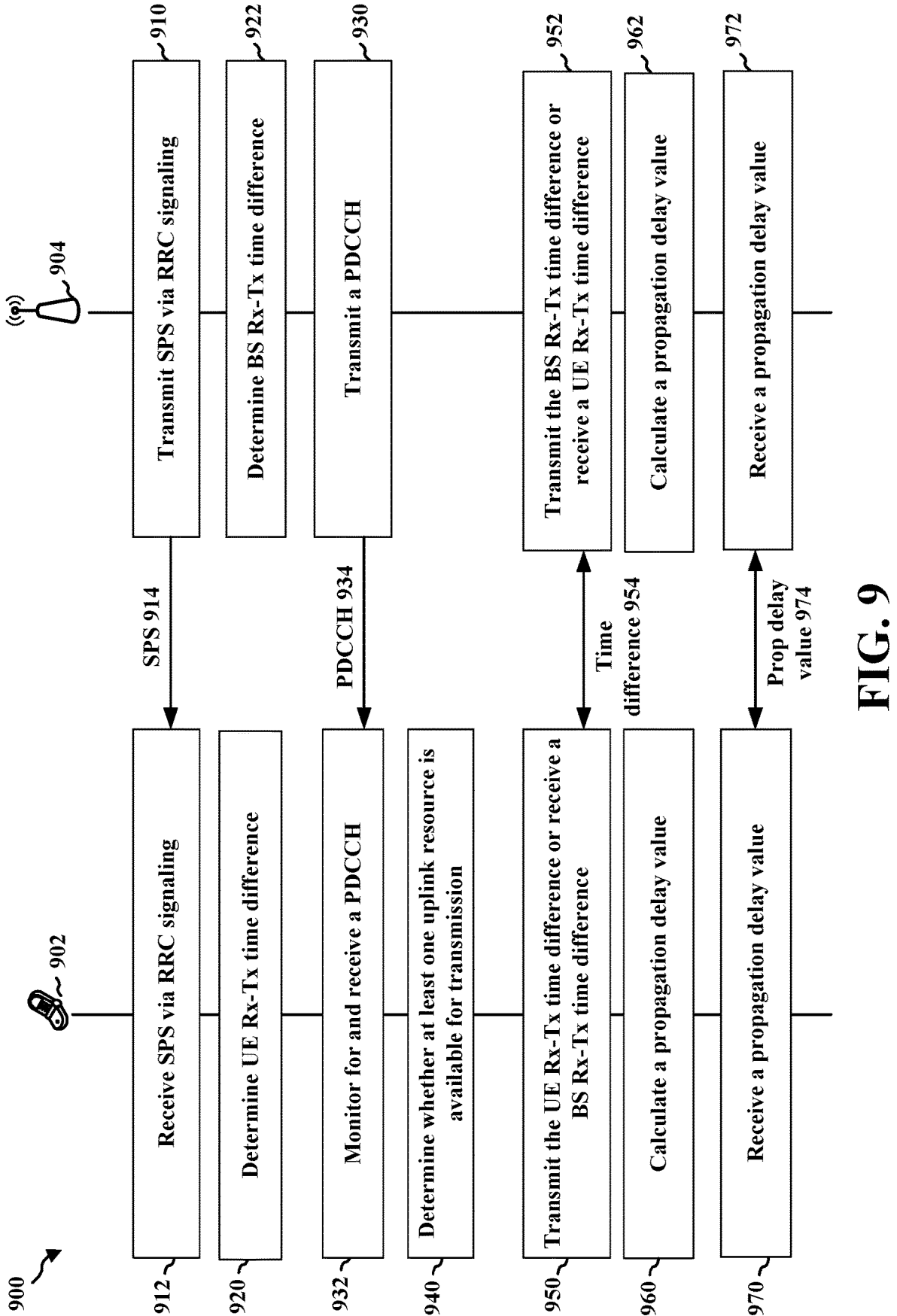
FIG. 9 is a diagram illustrating example communication between a UE and a base station in accordance with one or more techniques of the present disclosure.

FIG. 9 is a diagram 900 illustrating example communication between a UE 902 and a base station 904.

At 910, base station 904 may transmit, to a UE, SPS via RRC signaling, e.g., SPS 914. At 912, UE 902 may receive, from a base station, SPS via RRC signaling, e.g., SPS 914.

At 920, UE 902 may determine a UE reception (Rx) transmission (Tx) (Rx-Tx) time difference, the UE Rx-Tx time difference being equal to a difference between a downlink subframe reception time and an uplink subframe transmission time. At 922, base station 904 may determine a base station reception (Rx) transmission (Tx) (Rx-Tx) time difference, the base station Rx-Tx time difference being equal to a difference between an uplink subframe reception time and a downlink subframe transmission time.

At 930, base station 904 may transmit a PDCCH, e.g., PDCCH 934, to the UE, where the PDCCH indicates whether to transmit the base station Rx-Tx time difference or receive the UE Rx-Tx time difference. At 932, UE 902 may monitor for a PDCCH from the base station, and receive the PDCCH from the base station, e.g., PDCCH 934, where the PDCCH indicates whether to transmit the UE Rx-Tx time difference or receive the base station Rx-Tx time difference.

At 940, UE 902 may determine whether at least one uplink resource is available for transmission. In some instances, when the at least one uplink resource is available for transmission, a medium access control (MAC) control element (MAC-CE), a physical downlink control channel (PDCCH), a cyclic redundancy check (CRC) bit mask, or uplink control information (UCI) may indicate whether to transmit the UE Rx-Tx time difference or receive the base station Rx-Tx time difference. Also, when the at least one uplink resource is not available for transmission, a scheduling request (SR) or an uplink grant may indicate whether to transmit the UE Rx-Tx time difference.

At 950, UE 902 may transmit, to the base station, the UE Rx-Tx time difference or receive, from the base station, a base station Rx-Tx time difference, e.g., time difference 954, the base station Rx-Tx time difference being equal to a difference between an uplink subframe reception time and a downlink subframe transmission time. At 952, base station 904 may transmit, to the UE, the base station Rx-Tx time difference or receive, from the UE, a UE Rx-Tx time difference, e.g., time difference 954, the UE Rx-Tx time difference being equal to a difference between a downlink subframe reception time and an uplink subframe transmission time. In some aspects, the RRC signaling may indicate whether to transmit the UE Rx-Tx time difference or receive the base station Rx-Tx time difference.

At 960, when the base station Rx-Tx time difference is received from the base station, UE 902 may calculate a propagation delay value, where the propagation delay value is equal to a sum of the UE Rx-Tx time difference and the base station Rx-Tx time difference. At 962, when the UE Rx-Tx time difference is received from the UE, base station 904 may calculate a propagation delay value, where the propagation delay value is equal to a sum of the base station Rx-Tx time difference and the UE Rx-Tx time difference. The base station Rx-Tx time difference may be received via a SPS physical downlink shared channel (PDSCH).

At 970, when the UE Rx-Tx time difference is transmitted to the base station, UE 902 may receive, from the base station, a propagation delay value, e.g., propagation delay value 974, where the propagation delay value is equal to a sum of the UE Rx-Tx time difference and the base station Rx-Tx time difference. At 972, when the base station Rx-Tx time difference is transmitted to the UE, base station 904 may receive, from the UE, a propagation delay value, e.g., propagation delay value 974, where the propagation delay value is equal to a sum of the base station Rx-Tx time difference and the UE Rx-Tx time difference.

In some aspects, the UE Rx-Tx time difference may be transmitted via an uplink configured grant (CG). The UE Rx-Tx time difference may be based on a predefined time offset between a physical (PHY) layer and a RRC message or a medium access control (MAC) control element (MAC-CE). The UE Rx-Tx time difference may be based on disabling a scheduling request (SR) for one or more RRC messages or one or more medium access control (MAC) control elements (MAC-CEs). Also, the UE Rx-Tx time difference may be based on a scheduling request (SR) delay timer. Further, the UE Rx-Tx time difference may be based on at least one logic channel.

In some instances, the UE Rx-Tx time difference may be transmitted, or the base station Rx-Tx time difference may be received, via a RRC message or a medium access control (MAC) control element (MAC-CE). The UE Rx-Tx time difference may be transmitted when the UE Rx-Tx time difference exceeds a UE Rx-Tx time difference threshold, or the base station Rx-Tx time difference may be received when the base station Rx-Tx time difference exceeds a base station Rx-Tx time difference threshold. Also, the UE Rx-Tx time difference may be transmitted when an uplink pathloss exceeds an uplink pathloss threshold, or the base station Rx-Tx time difference may be received when a downlink pathloss exceeds a downlink pathloss threshold. Further, the UE Rx-Tx time difference may be transmitted, or the base station Rx-Tx time difference may be received, when a timing advance (TA) adjustment exceeds a TA adjustment threshold. The UE Rx-Tx time difference may also be transmitted, or the base station Rx-Tx time difference may also be received, based on at least one of a UE mobility or a handover.

Figure 10:
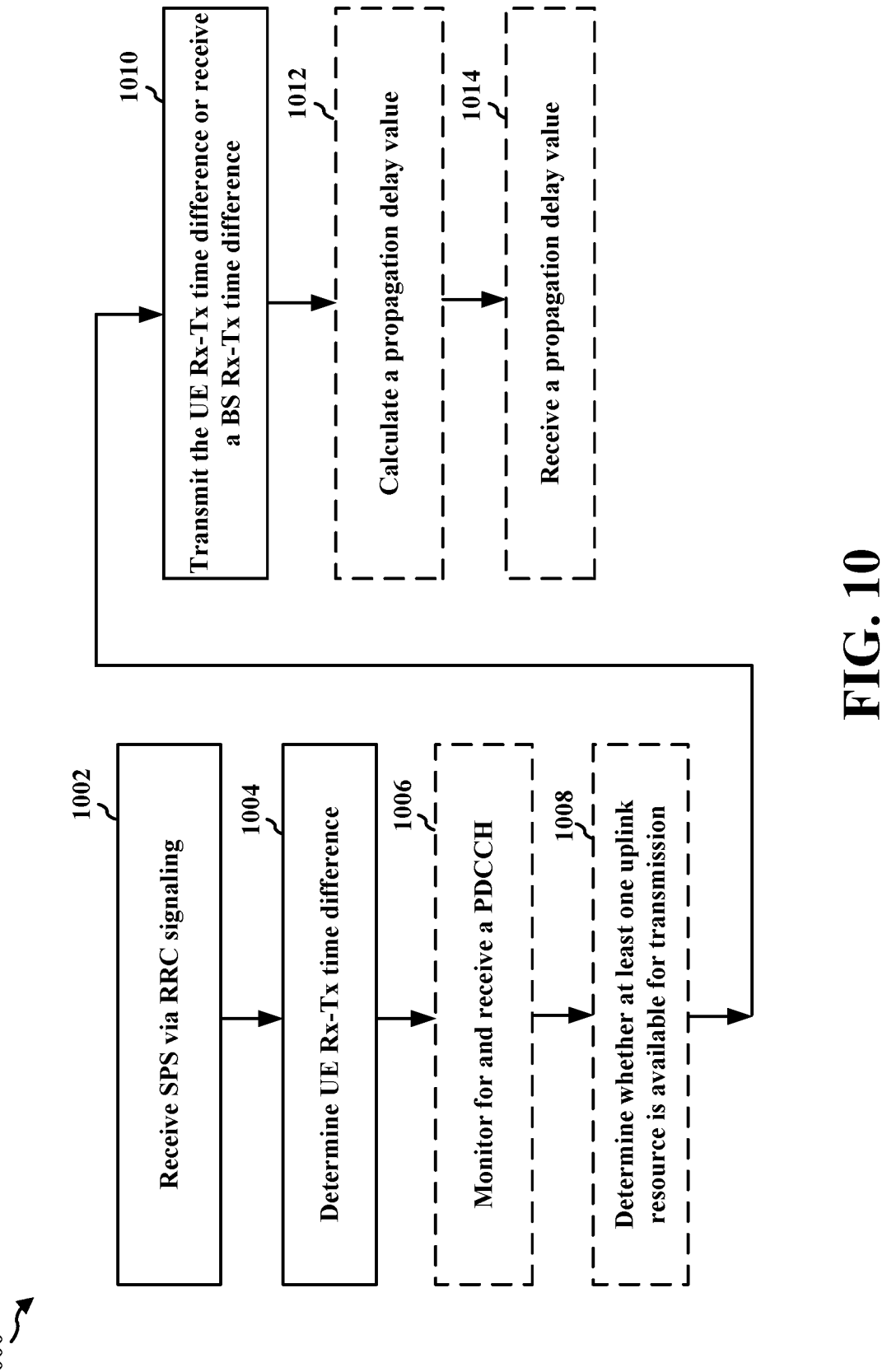
FIG. 10 is a flowchart of a method of wireless communication.

FIG. 10 is a flowchart 1000 of a method of wireless communication. The method may be performed by a UE or a component of a UE (e.g., the UE 104, 350, 902; the apparatus 1202; a processing system, which may include the memory 360 and which may be the entire UE or a component of the UE, such as the TX processor 368, the controller/processor 359, transmitter 354TX, antenna(s) 352, and/or the like). Optional aspects are illustrated with a dashed line. The methods described herein can provide a number of benefits, such as improving communication signaling, resource utilization, and/or power savings.

At 1002, the apparatus may receive, from a base station, SPS via RRC signaling, as described in connection with the examples in FIGS. 4, 5A, 5B, 6A, 6B, 7A, 7B, 8, and 9. For example, 1002 may be performed by determination component 1240.

At 1004, the apparatus may determine a UE reception (Rx) transmission (Tx) (Rx-Tx) time difference, the UE Rx-Tx time difference being equal to a difference between a downlink subframe reception time and an uplink subframe transmission time, as described in connection with the examples in FIGS. 4, 5A, 5B, 6A, 6B, 7A, 7B, 8, and 9. For example, 1004 may be performed by determination component 1240.

At 1006, the apparatus may monitor for a PDCCH from the base station, and receive the PDCCH from the base station, where the PDCCH indicates whether to transmit the UE Rx-Tx time difference or receive the base station Rx-Tx time difference, as described in connection with the examples in FIGS. 4, 5A, 5B, 6A, 6B, 7A, 7B, 8, and 9. For example, 1006 may be performed by determination component 1240.

At 1008, the apparatus may determine whether at least one uplink resource is available for transmission, as described in connection with the examples in FIGS. 4, 5A, 5B, 6A, 6B, 7A, 7B, 8, and 9. For example, 1008 may be performed by determination component 1240. In some instances, when the at least one uplink resource is available for transmission, a medium access control (MAC) control element (MAC-CE), a physical downlink control channel (PDCCH), a cyclic redundancy check (CRC) bit mask, or uplink control information (UCI) may indicate whether to transmit the UE Rx-Tx time difference or receive the base station Rx-Tx time difference, as described in connection with the examples in FIGS. 4, 5A, 5B, 6A, 6B, 7A, 7B, 8, and 9. Also, when the at least one uplink resource is not available for transmission, a scheduling request (SR) or an uplink grant may indicate whether to transmit the UE Rx-Tx time difference, as described in connection with the examples in FIGS. 4, 5A, 5B, 6A, 6B, 7A, 7B, 8, and 9.

At 1010, the apparatus may transmit, to the base station, the UE Rx-Tx time difference or receive, from the base station, a base station Rx-Tx time difference, the base station Rx-Tx time difference being equal to a difference between an uplink subframe reception time and a downlink subframe transmission time, as described in connection with the examples in FIGS. 4, 5A, 5B, 6A, 6B, 7A, 7B, 8, and 9. For example, 1010 may be performed by determination component 1240. In some aspects, the RRC signaling may indicate whether to transmit the UE Rx-Tx time difference or receive the base station Rx-Tx time difference, as described in connection with the examples in FIGS. 4, 5A, 5B, 6A, 6B, 7A, 7B, 8, and 9.

At 1012, when the base station Rx-Tx time difference is received from the base station, the apparatus may calculate a propagation delay value, where the propagation delay value is equal to a sum of the UE Rx-Tx time difference and the base station Rx-Tx time difference, as described in connection with the examples in FIGS. 4, 5A, 5B, 6A, 6B, 7A, 7B, 8, and 9. For example, 1012 may be performed by determination component 1240. The base station Rx-Tx time difference may be received via a SPS physical downlink shared channel (PDSCH), as described in connection with the examples in FIGS. 4, 5A, 5B, 6A, 6B, 7A, 7B, 8, and 9.

At 1014, when the UE Rx-Tx time difference is transmitted to the base station, the apparatus may receive, from the base station, a propagation delay value, where the propagation delay value is equal to a sum of the UE Rx-Tx time difference and the base station Rx-Tx time difference, as described in connection with the examples in FIGS. 4, 5A, 5B, 6A, 6B, 7A, 7B, 8, and 9. For example, 1014 may be performed by determination component 1240.

In some aspects, the UE Rx-Tx time difference may be transmitted via an uplink configured grant (CG), as described in connection with the examples in FIGS. 4, 5A, 5B, 6A, 6B, 7A, 7B, 8, and 9. The UE Rx-Tx time difference may be based on a predefined time offset between a physical (PHY) layer and a RRC message or a medium access control (MAC) control element (MAC-CE), as described in connection with the examples in FIGS. 4, 5A, 5B, 6A, 6B, 7A, 7B, 8, and 9. The UE Rx-Tx time difference may be based on disabling a scheduling request (SR) for one or more RRC messages or one or more medium access control (MAC) control elements (MAC-CEs), as described in connection with the examples in FIGS. 4, 5A, 5B, 6A, 6B, 7A, 7B, 8, and 9. Also, the UE Rx-Tx time difference may be based on a scheduling request (SR) delay timer, as described in connection with the examples in FIGS. 4, 5A, 5B, 6A, 6B, 7A, 7B, 8, and 9. Further, the UE Rx-Tx time difference may be based on at least one logic channel, as described in connection with the examples in FIGS. 4, 5A, 5B, 6A, 6B, 7A, 7B, 8, and 9.

In some instances, the UE Rx-Tx time difference may be transmitted, or the base station Rx-Tx time difference may be received, via a RRC message or a medium access control (MAC) control element (MAC-CE), as described in connection with the examples in FIGS. 4, 5A, 5B, 6A, 6B, 7A, 7B, 8, and 9. The UE Rx-Tx time difference may be transmitted when the UE Rx-Tx time difference exceeds a UE Rx-Tx time difference threshold, or the base station Rx-Tx time difference may be received when the base station Rx-Tx time difference exceeds a base station Rx-Tx time difference threshold, as described in connection with the examples in FIGS. 4, 5A, 5B, 6A, 6B, 7A, 7B, 8, and 9. Also, the UE Rx-Tx time difference may be transmitted when an uplink pathloss exceeds an uplink pathloss threshold, or the base station Rx-Tx time difference may be received when a downlink pathloss exceeds a downlink pathloss threshold, as described in connection with the examples in FIGS. 4, 5A, 5B, 6A, 6B, 7A, 7B, 8, and 9. Further, the UE Rx-Tx time difference may be transmitted, or the base station Rx-Tx time difference may be received, when a timing advance (TA) adjustment exceeds a TA adjustment threshold, as described in connection with the examples in FIGS. 4, 5A, 5B, 6A, 6B, 7A, 7B, 8, and 9. The UE Rx-Tx time difference may also be transmitted, or the base station Rx-Tx time difference may also be received, based on at least one of a UE mobility or a handover, as described in connection with the examples in FIGS. 4, 5A, 5B, 6A, 6B, 7A, 7B, 8, and 9.

Figure 11:
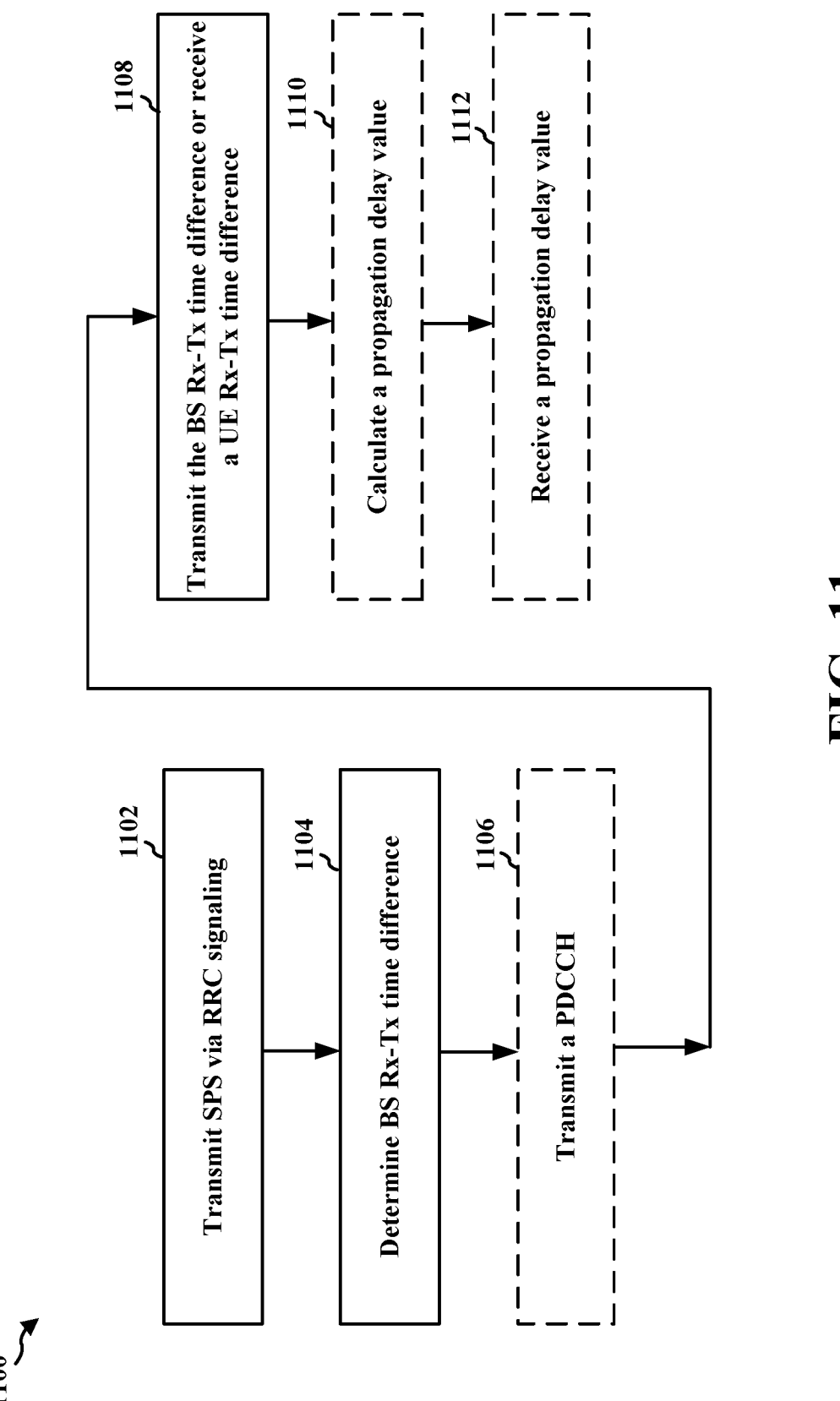
FIG. 11 is a flowchart of a method of wireless communication.

FIG. 11 is a flowchart 1100 of a method of wireless communication. The method may be performed by a base station or a component of a base station (e.g., the base station 102, 180, 310, 904; the apparatus 1302; a processing system, which may include the memory 376 and which may be the entire base station or a component of the base station, such as the antenna(s) 320, receiver 318RX, the RX processor 370, the controller/processor 375, and/or the like). Optional aspects are illustrated with a dashed line. The methods described herein can provide a number of benefits, such as improving communication signaling, resource utilization, and/or power savings.

At 1102, the apparatus may transmit, to a UE, SPS via radio resource control (RRC) signaling, as described in connection with the examples in FIGS. 4, 5A, 5B, 6A, 6B, 7A, 7B, 8, and 9. For example, 1102 may be performed by determination component 1340.

At 1104, the apparatus may determine a base station reception (Rx) transmission (Tx) (Rx-Tx) time difference, the base station Rx-Tx time difference being equal to a difference between an uplink subframe reception time and a downlink subframe transmission time, as described in connection with the examples in FIGS. 4, 5A, 5B, 6A, 6B, 7A, 7B, 8, and 9. For example, 1104 may be performed by determination component 1340.

At 1106, the apparatus may transmit a physical downlink control channel (PDCCH) to the UE, where the PDCCH indicates whether to transmit the base station Rx-Tx time difference or receive the UE Rx-Tx time difference, as described in connection with the examples in FIGS. 4, 5A, 5B, 6A, 6B, 7A, 7B, 8, and 9. For example, 1106 may be performed by determination component 1340.

At 1108, the apparatus may transmit, to the UE, the base station Rx-Tx time difference or receive, from the UE, a UE Rx-Tx time difference, the UE Rx-Tx time difference being equal to a difference between a downlink subframe reception time and an uplink subframe transmission time, as described in connection with the examples in FIGS. 4, 5A, 5B, 6A, 6B, 7A, 7B, 8, and 9. For example, 1108 may be performed by determination component 1340. The RRC signaling may indicate whether to transmit the base station Rx-Tx time difference or receive the UE Rx-Tx time difference, as described in connection with the examples in FIGS. 4, 5A, 5B, 6A, 6B, 7A, 7B, 8, and 9.

At 1110, when the UE Rx-Tx time difference is received from the UE, the apparatus may calculate a propagation delay value, where the propagation delay value is equal to a sum of the base station Rx-Tx time difference and the UE Rx-Tx time difference, as described in connection with the examples in FIGS. 4, 5A, 5B, 6A, 6B, 7A, 7B, 8, and 9. For example, 1110 may be performed by determination component 1340. The UE Rx-Tx time difference may be received via an uplink configured grant (CG), as described in connection with the examples in FIGS. 4, 5A, 5B, 6A, 6B, 7A, 7B, 8, and 9.

The UE Rx-Tx time difference may be based on a predefined time offset between a physical (PHY) layer and a RRC message or a medium access control (MAC) control element (MAC-CE), as described in connection with the examples in FIGS. 4, 5A, 5B, 6A, 6B, 7A, 7B, 8, and 9. The UE Rx-Tx time difference may be based on disabling a scheduling request (SR) for one or more RRC messages or one or more medium access control (MAC) control elements (MAC-CEs), as described in connection with the examples in FIGS. 4, 5A, 5B, 6A, 6B, 7A, 7B, 8, and 9. Also, the UE Rx-Tx time difference may be based on a scheduling request (SR) delay timer, as described in connection with the examples in FIGS. 4, 5A, 5B, 6A, 6B, 7A, 7B, 8, and 9. Further, the UE Rx-Tx time difference may be based on at least one logic channel, as described in connection with the examples in FIGS. 4, 5A, 5B, 6A, 6B, 7A, 7B, 8, and 9.

At 1112, when the base station Rx-Tx time difference is transmitted to the UE, the apparatus may receive, from the UE, a propagation delay value, where the propagation delay value is equal to a sum of the base station Rx-Tx time difference and the UE Rx-Tx time difference, as described in connection with the examples in FIGS. 4, 5A, 5B, 6A, 6B, 7A, 7B, 8, and 9. For example, 1112 may be performed by determination component 1340. The base station Rx-Tx time difference may be transmitted via a SPS physical downlink shared channel (PDSCH), as described in connection with the examples in FIGS. 4, 5A, 5B, 6A, 6B, 7A, 7B, 8, and 9.

In some aspects, the base station Rx-Tx time difference may be transmitted, or the UE Rx-Tx time difference may be received, via a RRC message or a medium access control (MAC) control element (MAC-CE), as described in connection with the examples in FIGS. 4, 5A, 5B, 6A, 6B, 7A, 7B, 8, and 9. The base station Rx-Tx time difference may be transmitted when the base station Rx-Tx time difference exceeds a base station Rx-Tx time difference threshold, or the UE Rx-Tx time difference may be received when the UE Rx-Tx time difference exceeds a UE Rx-Tx time difference threshold, as described in connection with the examples in FIGS. 4, 5A, 5B, 6A, 6B, 7A, 7B, 8, and 9. The base station Rx-Tx time difference may be transmitted when a downlink pathloss exceeds a downlink pathloss threshold, or the UE Rx-Tx time difference may be received when an uplink pathloss exceeds an uplink pathloss threshold, as described in connection with the examples in FIGS. 4, 5A, 5B, 6A, 6B, 7A, 7B, 8, and 9. The base station Rx-Tx time difference may be transmitted, or the UE Rx-Tx time difference may be received, when a timing advance (TA) adjustment exceeds a TA adjustment threshold, as described in connection with the examples in FIGS. 4, 5A, 5B, 6A, 6B, 7A, 7B, 8, and 9. The base station Rx-Tx time difference may be transmitted, or the UE Rx-Tx time difference may be received, based on at least one of a UE mobility or a handover, as described in connection with the examples in FIGS. 4, 5A, 5B, 6A, 6B, 7A, 7B, 8, and 9.

Also, at least one uplink resource may be determined to be available for transmission or not available for transmission, as described in connection with the examples in FIGS. 4, 5A, 5B, 6A, 6B, 7A, 7B, 8, and 9. When the at least one uplink resource is available for transmission, a medium access control (MAC) control element (MAC-CE), a physical downlink control channel (PDCCH), a cyclic redundancy check (CRC) bit mask, or uplink control information (UCI) may indicate whether to transmit the base station Rx-Tx time difference or receive the UE Rx-Tx time difference, as described in connection with the examples in FIGS. 4, 5A, 5B, 6A, 6B, 7A, 7B, 8, and 9. When the at least one uplink resource is not available for transmission, a scheduling request (SR) or an uplink grant may indicate whether to receive the UE Rx-Tx time difference, as described in connection with the examples in FIGS. 4, 5A, 5B, 6A, 6B, 7A, 7B, 8, and 9.

Figure 12:
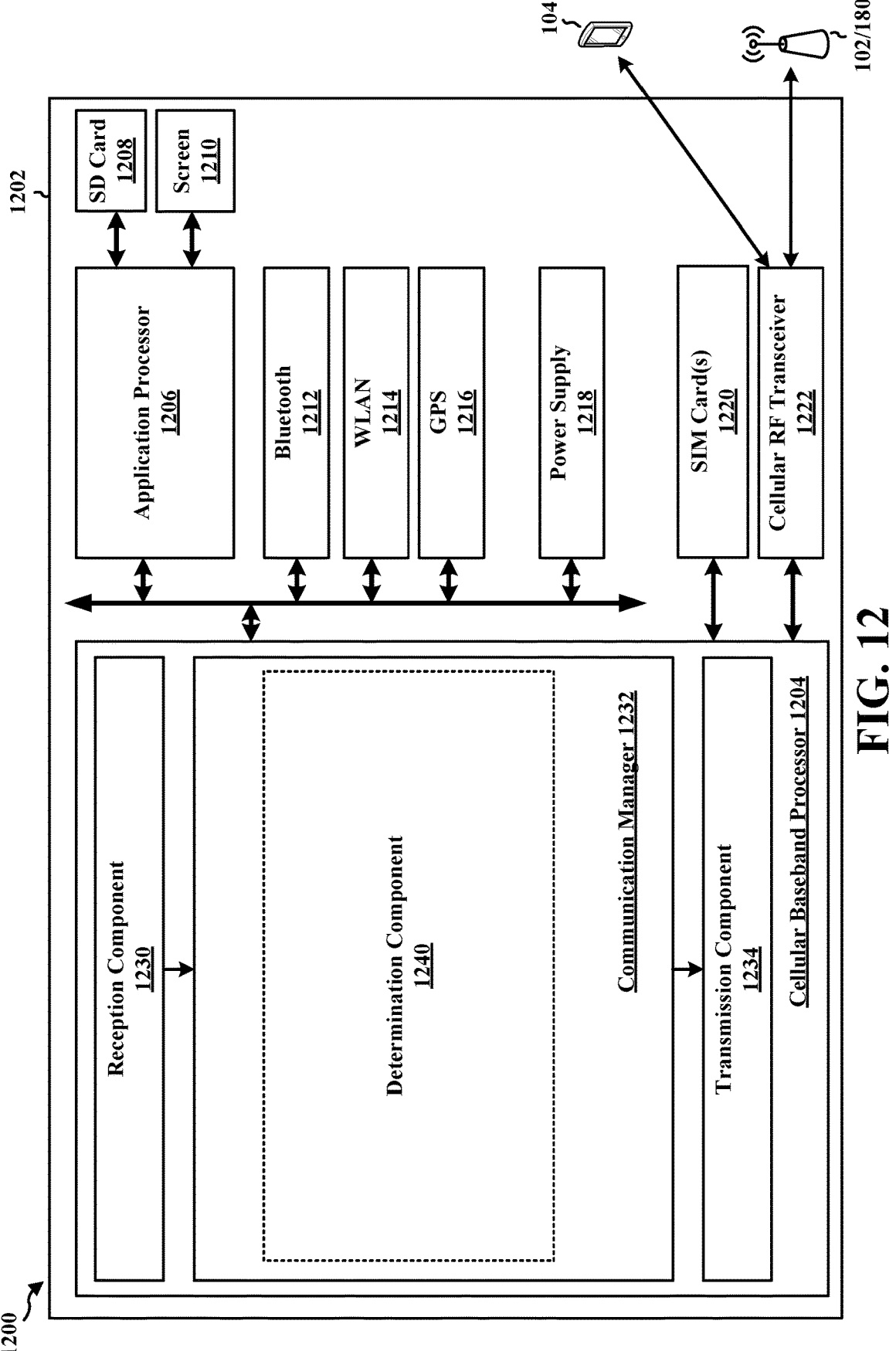
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a determination component 1240 that is configured to receive, from a base station, semi-persistent scheduling (SPS) via radio resource control (RRC) signaling, e.g., as described in connection with step 1002 above. Determination component 1240 can also be configured to determine a UE reception (Rx) transmission (Tx) (Rx-Tx) time difference, the UE Rx-Tx time difference being equal to a difference between a downlink subframe reception time and an uplink subframe transmission time, e.g., as described in connection with step 1004 above. Determination component 1240 can also be configured to transmit, to the base station, the UE Rx-Tx time difference or receive, from the base station, a base station Rx-Tx time difference, the base station Rx-Tx time difference being equal to a difference between an uplink subframe reception time and a downlink subframe transmission time, e.g., as described in connection with step 1010 above.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving, from a base station, semi-persistent scheduling (SPS) via radio resource control (RRC) signaling. The apparatus 1202 can also include means for determining a UE reception (Rx) transmission (Tx) (Rx-Tx) time difference, the UE Rx-Tx time difference being equal to a difference between a downlink subframe reception time and an uplink subframe transmission time. The apparatus 1202 can also include means for transmitting, to the base station, the UE Rx-Tx time difference or means for receiving, from the base station, a base station Rx-Tx time difference, the base station Rx-Tx time difference being equal to a difference between an uplink subframe reception time and a downlink subframe transmission time. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
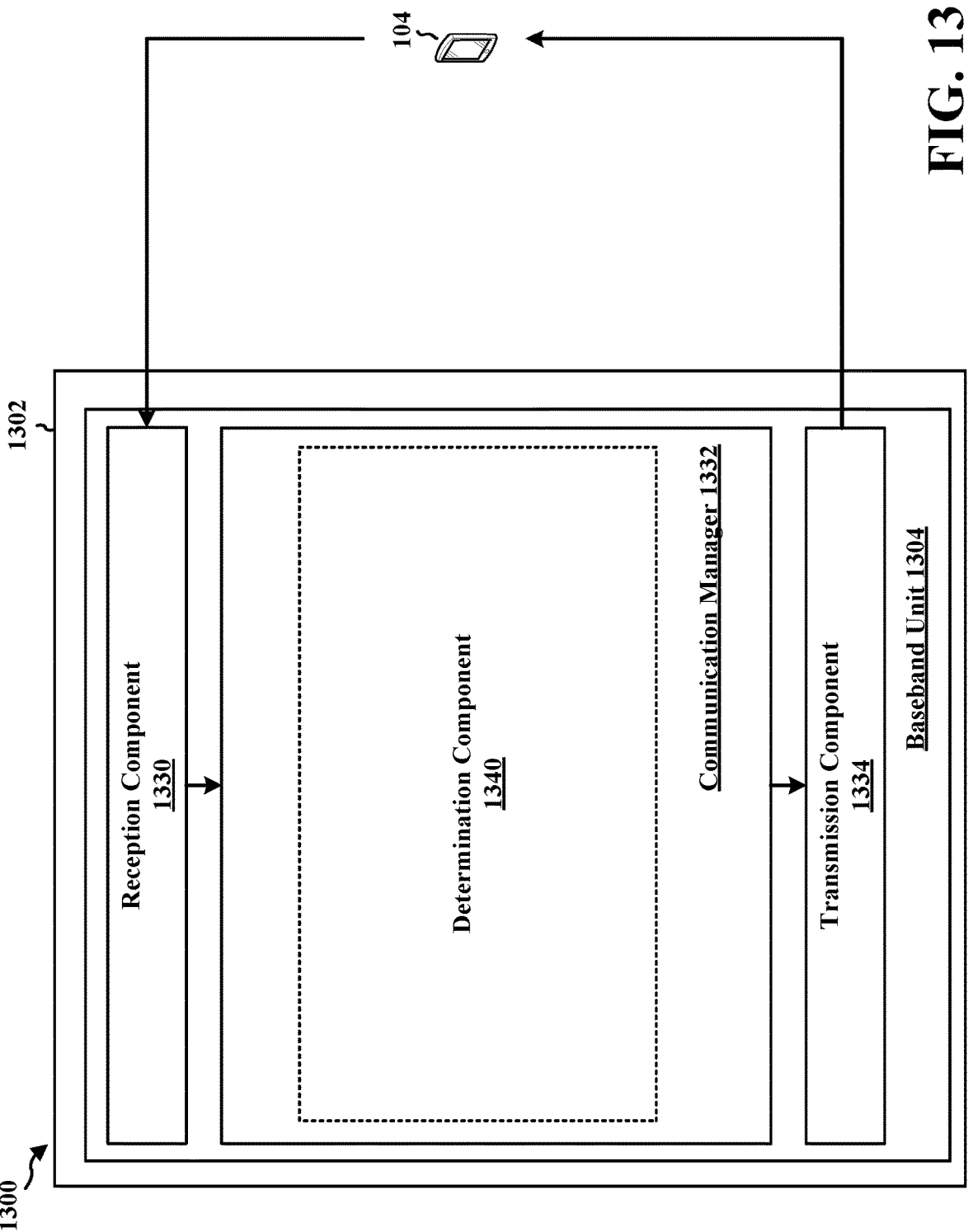
FIG. 13 is a diagram illustrating an example of a hardware implementation for an example apparatus.

FIG. 13 is a diagram 1300 illustrating an example of a hardware implementation for an apparatus 1302. The apparatus 1302 is a base station and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a determination component 1340 that is configured to transmit, to a user equipment (UE), semi-persistent scheduling (SPS) via radio resource control (RRC) signaling, e.g., as described in connection with step 1102 above. Determination component 1340 can also be configured to determine a base station reception (Rx) transmission (Tx) (Rx-Tx) time difference, the base station Rx-Tx time difference being equal to a difference between an uplink subframe reception time and a downlink subframe transmission time, e.g., as described in connection with step 1104 above. Determination component 1340 can also be configured to transmit, to the UE, the base station Rx-Tx time difference or receive, from the UE, a UE Rx-Tx time difference, the UE Rx-Tx time difference being equal to a difference between a downlink subframe reception time and an uplink subframe transmission time, e.g., as described in connection with step 1108 above.

The apparatus may include additional components that perform each of the blocks of the algorithm in the aforementioned flowcharts of FIGS. 9 and 11. As such, each block in the aforementioned flowcharts of FIGS. 9 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmitting, to a user equipment (UE), semi-persistent scheduling (SPS) via radio resource control (RRC) signaling. The apparatus 1302 can also include means for determining a base station reception (Rx) transmission (Tx) (Rx-Tx) time difference, the base station Rx-Tx time difference being equal to a difference between an uplink subframe reception time and a downlink subframe transmission time. The apparatus 1302 can also include means for transmitting, to the UE, the base station Rx-Tx time difference or means for receiving, from the UE, a UE Rx-Tx time difference, the UE Rx-Tx time difference being equal to a difference between a downlink subframe reception time and an uplink subframe transmission time. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:

receiving, from a base station, semi-persistent scheduling (SPS) via radio resource control (RRC) signaling;

determining a UE reception (Rx) transmission (Tx) (Rx-Tx) time difference, the UE Rx-Tx time difference being equal to a difference between a downlink subframe reception time and an uplink subframe transmission time; and transmitting, to the base station, the UE Rx-Tx time difference or receiving, from the base station, a base station Rx-Tx time difference, the base station Rx-Tx time difference being equal to a difference between an uplink subframe reception time and a downlink subframe transmission time, wherein transmission of the UE Rx-Tx time difference or reception of the base station Rx-Tx difference is based on an RRC message, and wherein transmission of the UE Rx-Tx time difference is when a downlink pathloss exceeds a downlink pathloss threshold, or reception of the base station Rx-Tx time difference is when an uplink pathloss exceeds an uplink pathloss threshold.

2. An apparatus for wireless communication at a user equipment (UE), comprising:

memory; and at least one processor coupled to the memory and configured to:

receive, from a base station, semi-persistent scheduling (SPS) via radio resource control (RRC) signaling;

determine a UE reception (Rx) transmission (Tx) (Rx-Tx) time difference, the UE Rx-Tx time difference being equal to a difference between a downlink subframe reception time and an uplink subframe transmission time; and transmit, to the base station, the UE Rx-Tx time difference or receive, from the base station, a base station Rx-Tx time difference, the base station Rx-Tx time difference being equal to a difference between an uplink subframe reception time and a downlink subframe transmission time, wherein reception of the base station Rx-Tx time difference is via a physical downlink shared channel (PDSCH), and wherein transmission of the UE Rx-Tx time difference is when a downlink pathloss exceeds a downlink pathloss threshold, or reception of the base station Rx-Tx time difference is when an uplink pathloss exceeds an uplink pathloss threshold.

3. The apparatus of claim 2, wherein the RRC signaling indicates whether to transmit the UE Rx-Tx time difference or receive the base station Rx-Tx time difference.

4. The apparatus of claim 2, wherein the at least one processor is further configured to:

monitor for a physical downlink control channel (PDCCH) from the base station; and receive the PDCCH from the base station, wherein the PDCCH indicates whether to transmit the UE Rx-Tx time difference or receive the base station Rx-Tx time difference.

5. The apparatus of claim 2, wherein to receive the base station Rx-Tx time difference, the at least one processor is configured to receive the base station Rx-Tx time difference from the base station, wherein the at least one processor is further configured to:

calculate a propagation delay value, wherein the propagation delay value is equal to a sum of the UE Rx-Tx time difference and the base station Rx-Tx time difference.

6. The apparatus of claim 5, wherein to receive the base station Rx-Tx time difference, the at least one processor is configured to receive the base station Rx-Tx time difference via a SPS physical downlink shared channel (PDSCH).

7. The apparatus of claim 2, wherein to transmit the UE Rx-Tx time difference, the at least one processor is configured to transmit the UE Rx-Tx time difference to the base station, wherein the at least one processor is further configured to:

receive, from the base station, a propagation delay value, wherein the propagation delay value is equal to a sum of the UE Rx-Tx time difference and the base station Rx-Tx time difference.

8. The apparatus of claim 7, wherein to transmit the UE Rx-Tx time difference, the at least one processor is configured to transmit the UE Rx-Tx time difference via an uplink configured grant (CG).

9. The apparatus of claim 8, wherein the UE Rx-Tx time difference is based on a predefined time offset between a physical (PHY) layer and an RRC message or a medium access control (MAC) control element (MAC-CE).

10. The apparatus of claim 8, wherein the UE Rx-Tx time difference is based on disabling a scheduling request (SR) for one or more RRC messages or one or more MAC-CEs.

11. The apparatus of claim 8, wherein the UE Rx-Tx time difference is based on a scheduling request (SR) delay timer or at least one logic channel.

12. The apparatus of claim 2, wherein transmission of the UE Rx-Tx time difference is when the UE Rx-Tx time difference exceeds a UE Rx-Tx time difference threshold, or reception of the base station Rx-Tx time difference is when the base station Rx-Tx time difference exceeds a base station Rx-Tx time difference threshold.

13. The apparatus of claim 2, wherein transmission of the UE Rx-Tx time difference is, or reception of the base station Rx-Tx time difference is, when a timing advance (TA) adjustment exceeds a TA adjustment threshold.

14. The apparatus of claim 2, wherein transmission of the UE Rx-Tx time difference is, or reception of the base station Rx-Tx time difference is, based on at least one of a UE mobility or a handover.

15. The apparatus of claim 2, wherein the at least one processor is further configured to:

determine whether at least one uplink resource is available for transmission.

16. The apparatus of claim 15, wherein, when the at least one uplink resource is available for transmission, a medium access control (MAC) control element (MAC-CE), a physical downlink control channel (PDCCH), a cyclic redundancy check (CRC) bit mask, or uplink control information (UCI) indicates whether to transmit the UE Rx-Tx time difference or receive the base station Rx-Tx time difference.

17. The apparatus of claim 15, wherein, when the at least one uplink resource is not available for transmission, a scheduling request (SR) or an uplink grant indicates whether to transmit the UE Rx-Tx time difference.

18. An apparatus for wireless communication at a user equipment (UE), comprising:

means for receiving, from a base station, semi-persistent scheduling (SPS) via radio resource control (RRC) signaling;

means for determining a UE reception (Rx) transmission (Tx) (Rx-Tx) time difference, the UE Rx-Tx time difference being equal to a difference between a downlink subframe reception time and an uplink subframe transmission time; and means for transmitting, to the base station, the UE Rx-Tx time difference or means for receiving, from the base station, a base station Rx-Tx time difference, the base station Rx-Tx time difference being equal to a difference between an uplink subframe reception time and a downlink subframe transmission time, wherein transmission of the UE Rx-Tx time difference or reception of the base station Rx-Tx difference is based on an RRC message, and wherein transmission of the UE Rx-Tx time difference is when a downlink pathloss exceeds a downlink pathloss threshold, or reception of the base station Rx-Tx time difference is when an uplink pathloss exceeds an uplink pathloss threshold.

19. A method of wireless communication at a base station, comprising:

transmitting, to a user equipment (UE), semi-persistent scheduling (SPS) via radio resource control (RRC) signaling;

determining a base station reception (Rx) transmission (Tx) (Rx-Tx) time difference, the base station Rx-Tx time difference being equal to a difference between an uplink subframe reception time and a downlink subframe transmission time; and transmitting, to the UE, the base station Rx-Tx time difference or receiving, from the UE, a UE Rx-Tx time difference, the UE Rx-Tx time difference being equal to a difference between a downlink subframe reception time and an uplink subframe transmission time, wherein reception of the UE Rx-Tx time difference or transmission of the base station Rx-Tx difference is based on an RRC message, and wherein reception of the UE Rx-Tx time difference is when a downlink pathloss exceeds a downlink pathloss threshold, or transmission of the base station Rx-Tx time difference is when an uplink pathloss exceeds an uplink pathloss threshold.

20. An apparatus for wireless communication at a base station, comprising:

memory; and at least one processor coupled to the memory and configured to:

transmit, to a user equipment (UE), semi-persistent scheduling (SPS) via radio resource control (RRC) signaling;

determine a base station reception (Rx) transmission (Tx) (Rx-Tx) time difference, the base station Rx-Tx time difference being equal to a difference between an uplink subframe reception time and a downlink subframe transmission time; and transmit, to the UE, the base station Rx-Tx time difference or receive, from the UE, a UE Rx-Tx time difference, the UE Rx-Tx time difference being equal to a difference between a downlink subframe reception time and an uplink subframe transmission time, wherein reception of the UE Rx-Tx time difference or transmission of the base station Rx-Tx difference is based on an RRC message, and wherein reception of the UE Rx-Tx time difference is when a downlink pathloss exceeds a downlink pathloss threshold, or transmission of the base station Rx-Tx time difference is when an uplink pathloss exceeds an uplink pathloss threshold.

21. The apparatus of claim 20, wherein the RRC signaling indicates whether to transmit the base station Rx-Tx time difference or receive the UE Rx-Tx time difference.

22. The apparatus of claim 20, wherein the at least one processor is further configured to:

transmit a physical downlink control channel (PDCCH) to the UE, wherein the PDCCH indicates whether to transmit the base station Rx-Tx time difference or receive the UE Rx-Tx time difference.

23. The apparatus of claim 20, wherein to transmit the base station Rx-Tx time difference, the at least one processor is configured to transmit the base station Rx-Tx time difference to the UE, wherein the at least one processor is further configured to:

receive, from the UE, a propagation delay value, wherein the propagation delay value is equal to a sum of the base station Rx-Tx time difference and the UE Rx-Tx time difference.

24. The apparatus of claim 23, wherein to transmit the base station Rx-Tx time difference, the at least one processor is configured to transmit the base station Rx-Tx time difference via a SPS physical downlink shared channel (PDSCH).

25. The apparatus of claim 20, wherein to receive the UE Rx-Tx time difference, the at least one processor is configured to receive the UE Rx-Tx time difference from the UE, wherein the at least one processor is further configured to:

calculate a propagation delay value, wherein the propagation delay value is equal to a sum of the base station Rx-Tx time difference and the UE Rx-Tx time difference.

26. The apparatus of claim 25, wherein to receive the UE Rx-Tx time difference, the at least one processor is configured to receive the UE Rx-Tx time difference via an uplink configured grant (CG).

27. The apparatus of claim 26, wherein the UE Rx-Tx time difference is based on a predefined time offset between a physical (PHY) layer and an RRC message or a medium access control (MAC) control element (MAC-CE).

28. The apparatus of claim 26, wherein the UE Rx-Tx time difference is based on disabling a scheduling request (SR) for one or more RRC messages or one or more medium access control (MAC) control elements (MAC-CEs).

29. The apparatus of claim 26, wherein the UE Rx-Tx time difference is based on a scheduling request (SR) delay timer or at least one logic channel or at least one logic channel.

30. The apparatus of claim 20, wherein transmission of the base station Rx-Tx time difference is when the base station Rx-Tx time difference exceeds a base station Rx-Tx time difference threshold, or reception of the UE Rx-Tx time difference is when the UE Rx-Tx time difference exceeds a UE Rx-Tx time difference threshold.

31. The apparatus of claim 20, wherein transmission of the base station Rx-Tx time difference is, or reception of the UE Rx-Tx time difference is, when a timing advance (TA) adjustment exceeds a TA adjustment threshold.

\* \* \* \* \*